United States Patent
Lv et al.

(10) Patent No.: US 12,512,921 B2
(45) Date of Patent: Dec. 30, 2025

(54) PORT STATUS CONFIGURATION METHOD, APPARATUS, AND SYSTEM, AND STORAGE MEDIUM

(71) Applicant: HUAWEI TECHNOLOGIES CO., LTD., Guangdong (CN)

(72) Inventors: Jingfei Lv, Wuhan (CN); Fang Yu, Shenzhen (CN); Boling Fan, Dongguan (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 369 days.

(21) Appl. No.: 17/990,089

(22) Filed: Nov. 18, 2022

(65) Prior Publication Data
US 2023/0091501 A1    Mar. 23, 2023

Related U.S. Application Data

(63) Continuation of application No. PCT/CN2021/094458, filed on May 18, 2021.

(30) Foreign Application Priority Data

May 20, 2020   (CN) .......................... 202010432875.4

(51) Int. Cl.
    *H04J 3/06*      (2006.01)
    *H04W 56/00*    (2009.01)

(52) U.S. Cl.
    CPC ......... *H04J 3/0667* (2013.01); *H04W 56/001* (2013.01)

(58) Field of Classification Search
    CPC .............................. H04W 56/001; H04J 3/0667
    (Continued)

(56) References Cited

U.S. PATENT DOCUMENTS 11,632,810 B2 *   4/2023  Sivasiva Ganesan ......................
                                                H04W 48/16
                                                    370/329
12,184,405 B2 * 12/2024  Lv .......................... H04J 3/0641
(Continued)

FOREIGN PATENT DOCUMENTS

CN    102457346 A    5/2012
CN    103051486 A    4/2013
(Continued)

OTHER PUBLICATIONS

C1-198234, Huawei et al., Discussion on delivery of gPTP messages for time synchronization, 3GPP TSG Ct WG1 Meeting #121, Reno (US), Nov. 11-15, 2019, 4 pages.
(Continued)

*Primary Examiner* — Amritbir K Sandhu
(74) *Attorney, Agent, or Firm* — WOMBLE BOND DICKINSON (US) LLP

(57) ABSTRACT

This application discloses a port status configuration method, apparatus, and system, and a storage medium, and belongs to the communication field. In an embodiment, a configuration device obtains port datasets of M ports of N translators, where N is an integer greater than 1, M is an integer greater than 1, the N translators are integrated in at least two independent devices, the M ports are M precision time protocol ports, and the port datasets are precision time protocol port datasets. The configuration device configures port statuses of the M ports based on the port datasets of the M ports, where the port statuses are precision time protocol port statuses. This application achieves automatic configuration of the port statuses and improves configuration accuracy.

20 Claims, 9 Drawing Sheets

(58) Field of Classification Search
USPC .......................................................... 398/52
See application file for complete search history.

(56) References Cited

U.S. PATENT DOCUMENTS

| | | | |
|---|---|---|---|
| 2017/0250908 A1 | 8/2017 | Nainar et al. | |
| 2018/0013508 A1* | 1/2018 | Rabinovich | H04J 3/0667 |
| 2020/0259896 A1* | 8/2020 | Sachs | H04L 67/12 |
| 2021/0274585 A1* | 9/2021 | Yu | H04L 67/146 |
| 2021/0328696 A1* | 10/2021 | Lv | H04J 3/0679 |
| 2021/0352536 A1* | 11/2021 | Prabhakar | H04L 43/0852 |
| 2022/0046570 A1* | 2/2022 | Moon | H04J 3/0667 |
| 2022/0337384 A1* | 10/2022 | Lv | H04L 7/0008 |
| 2023/0164713 A1* | 5/2023 | Ke | H04L 45/3065 370/350 |
| 2023/0262625 A1* | 8/2023 | Lyu | H04W 56/001 370/350 |

FOREIGN PATENT DOCUMENTS

| | | | | |
|---|---|---|---|---|
| CN | 104410170 A | * | 3/2015 | |
| CN | 106533600 A | | 3/2017 | |
| CN | 107465475 A | * | 12/2017 | ............ H04J 3/0635 |
| CN | 110113127 A | | 8/2019 | |
| CN | 110611924 A | * | 12/2019 | ............ H04W 76/30 |
| EP | 4037366 A1 | * | 8/2022 | ............ H04L 47/801 |
| WO | 2013143112 A1 | | 10/2013 | |
| WO | 2017130034 A1 | | 8/2017 | |
| WO | WO-2020081060 A1 | * | 4/2020 | ............ H04L 69/28 |
| WO | WO-2021233313 A1 | * | 11/2021 | ................ H04J 3/12 |

OTHER PUBLICATIONS

3GPP TS 23.501 V16.4.0 (Mar. 2020), 3rd Generation Partnership Project;Technical Specification Group Services and System Aspects;System architecture for the 5G System (5GS);Stage 2(Release 16), 430 pages.

IEEE Std 802.1AS-2011, IEEE Standard for Local and metropolitan area networks—Timing and Synchronization for Time-Sensitive Applications in Bridged Local Area Networks, 292 pages.

S2-1903378, Ericsson, Support for IEEE 802.1Qbv scheduling, 3GPP TSG-SA WG2 Meeting #132, Xi an-China, Apr. 8-12, 2019, 6 pages.

IEEE 15881588 VersionVersion 22, GeoGffffrey MM. GGarner Consultant, Sep. 24, 2008, 89 pages.

IEEE Std 1588-2008(Revision of IEEE Std 1588-2002), IEEE Standard for a Precision Clock Synchronization Protocol for Networked Measurement and Control Systems, IEEE Instrumentation and Measurement Society, 289 pages.

S2-2004905, Ericsson, Addressing wording comments from IEEE LS response on TSN support, SA WG2 Meeting #S2-140E, Aug. 19-Sep. 2, 2020, Electronic, 20 pages.

ITU-T G.8275.1/Y.1369.1(Mar. 2020), Series G: Transmission Systems and Media, Digital Systems and Networks Packet over Transport aspects Synchronization, quality and availability targets Series Y: Global Information Infrastructure, Internet Protocol Aspects, Next-Generation Networks, Internet of Things and Smart Cities Internet protocol aspects Transport, Precision time protocol telecom profile for phase/time synchronization with full timing support from the network, 62 pages.

ITU-T G.8275.2/Y.1369.2(Mar. 2020), Series G: Transmission Systems and Media, Digital Systems and Networks Packet over Transport aspects Synchronization, quality and availability targets Series Y: Global Information Infrastructure, Internet Protocol Aspects, Next-Generation Networks, Internet of Things and Smart Cities Internet protocol aspects Transport, Precision time protocol telecom profile for phase/time synchronization with partial timing support from the network, 70 pages.

ITU-T Series G Supplement 68 (Feb. 2020), Series G: Transmission Systems and Media, Digital Systems and Networks, Synchronization OAM requirements, 20 pages.

* cited by examiner

PORT STATUS CONFIGURATION METHOD, APPARATUS, AND SYSTEM, AND STORAGE MEDIUM

CROSS-REFERENCE TO RELATED APPLICATIONS

This application is a continuation of International Application No. PCT/CN2021/094458 filed on May 18, 2021, which claims priority to Chinese Patent Application No. 202010432875.4 filed on May 20, 2020. The disclosures of the aforementioned applications are hereby incorporated by reference in their entireties.

TECHNICAL FIELD

This application relates to the communication field, and in particular, to a port status configuration method, apparatus, and system, and a storage medium.

BACKGROUND

Currently, time sensitive network (TSN) services may be carried on a 5G network. The 5G network is connected to a plurality of TSN devices, and is required to support transmission of a 1588 PTP packet of the TSN device. For example, a first TSN device is connected to a first translator in the 5G network, and a second TSN device is connected to a second translator in the 5G network. In this case, the 5G network needs to transfer, to the second TSN device, a time carried in the 1588 PTP packet sent by the first TSN device.

The first TSN device is connected to a port of the first translator, and the second TSN device is connected to a port of the second translator. Before the first TSN device sends the 1588 PTP packet to the second TSN device via the 5G network, technical engineers need to manually set a state of the port of the first translator connected to the first TSN device to a slave (Slave) state, and manually set a state of the port of the second translator connected to the second TSN device to a master (Master) state. In this way, the first translator may receive the 1588 PTP packet from the first TSN device through the port in the Slave state, and the second translator sends the 1588 PTP packet to the second TSN device through the port in the Master state.

The conventional technology has at least the following problems:

Manually setting a port state of a translator in a 5G network results in low setting efficiency and incurs inaccuracy. In addition, if a port state needs to be changed, automatic configuration cannot be implemented using the method for manually setting a port status.

SUMMARY

This application provides a port status configuration method, apparatus, and system, and a storage medium, to implement automatic configuration of port statuses and improve configuration accuracy. The technical solutions are as follows:

According to a first aspect, an embodiment of this application provides a port status configuration method. In the method, a configuration device obtains port datasets of M ports of N translators, where N is an integer greater than 1, M is an integer greater than 1, the N translators are integrated into at least two independent devices, the M ports are M precision time protocol ports, and the port datasets are precision time protocol port datasets. The configuration device configures port statuses of the M ports based on the port datasets of the M ports, where the port statuses are precision time protocol port statuses.

The N translators are integrated into at least two independent devices, and the configuration device obtains the port datasets of the M ports of the N translators, and configures the port statuses of the M ports based on the port datasets of the M ports. This implements automatic configuration of the port statuses and improves configuration accuracy. Because the port status can be automatically configured, the port status can be modified in time in the case of changes occurring on the port status of the translator.

In an embodiment, the configuration device configures the port statuses of the M ports based on the port datasets of the M ports and a preset dataset, where the preset dataset is a preset precision time protocol dataset, to configure the port statuses of the M ports based on the port datasets of the M ports.

In an embodiment, the configuration device selects an optimal dataset from the port datasets of the M ports. When the optimal dataset is better than the preset dataset, the configuration device generates a target dataset based on the optimal dataset. A value of a stepsRemoved field in the target dataset is greater than a value of a stepsRemoved field in the optimal dataset by 1, the preset dataset is a preset precision time protocol dataset, and the target dataset is a precision time protocol dataset. When the preset dataset is better than the optimal dataset, the configuration device uses the preset dataset as the target dataset. In this way, the configuration device may find the optimal dataset from the port datasets of the M ports and the preset dataset, and obtain the target dataset based on the optimal dataset, to improve precision of the target dataset.

In an embodiment, the configuration device determines a port status of each of the M ports. The configuration device sends the port status of each of the M ports to a translator including all of the ports, where the port status is sent via a packet. This ensures that each translator sets a port status of a respective port based on the obtained port status of the respective port.

In an embodiment, the configuration device sends the target dataset to the N translators, where the target dataset is sent via a packet. In this way, the translator may obtain the target dataset. When the translator sends an Announce packet, a clock parameter in the Announce packet sent by the translator may be a clock parameter in the target dataset delivered by the configuration device, to satisfy corresponding scenarios.

In an embodiment, when both the target dataset and the port status are sent via a packet, the target dataset and the port status are included in a same packet, or included in different packets.

In an embodiment, the preset dataset is a dataset of a virtual device of a communication network, and the communication network is a network including the N translators.

In an embodiment, the configuration device obtains the port dataset via a port dataset packet.

In an embodiment, the configuration device determines a port identity of each of the M ports, and sends the port identity of each port to a translator including all of the ports. The port identity is sent via a packet, and the port identity of each port is a precision time protocol port identity. In this way, each translator obtains a port identity of a respective port, so that the port identity may be used to request the configuration device to configure a port status.

In an embodiment, the configuration device determines the port identity of each port based on a port number of each port and an identity of the virtual device of the communication network, where the communication network is a network including the N translators, and the port number of each port is a precision time protocol port number, to configure the port identity of each port.

In an embodiment, the configuration device sends a system-level parameter of the virtual device of the communication network to the N translators, where the communication network is a network including the N translators, and the system-level parameter is a precision time protocol system-level parameter. In this way, when the translator sends a Sync packet, a system-level parameter in the Sync packet sent by the translator may be a system-level parameter delivered by the configuration device. This can satisfy corresponding scenarios.

In an embodiment, the translator is a network-side time sensitive network translator (NW-TT) or a device-side time sensitive network translator (DS-TT).

In an embodiment, the NW-TT is an independent device, or the NW-TT is integrated into a user plane function (UPF) device; and the DS-TT is an independent device, or the DS-TT is integrated into user equipment (UE).

In an embodiment, the configuration device is deployed in a communication network for connecting a TSN device.

In an embodiment, the configuration device is an independent device, or is integrated into one of the N translators, or is located in a same device as one or more of the N translators.

In an embodiment, the port status includes a slave state, a master state, or a passive state.

According to a second aspect, this application provides a port status configuration method. In the method, a first translator of N translators obtains port datasets of W ports of the first translator, where W is an integer greater than or equal to 1, N is an integer greater than 1, and the port datasets are precision time protocol port datasets. The first translator sends the port datasets of the W ports to a configuration device, where the port datasets are used by the configuration device to determine port statuses of the W ports based on the port datasets of the W ports and port datasets of ports of other translators of the N translators, the N translators are integrated in at least two independent devices, and the port statuses of the W ports are precision time protocol port statuses.

Because the N translators are integrated in at least two independent devices, the first translator of the N translators obtains and sends the port datasets of the W ports of the first translator to the configuration device, and other N−1 translators of the N translators also send the port datasets to the configuration device. In this way, the configuration device may obtain the port datasets of the ports of the N translators, and configure the port statuses of the W ports based on the received port datasets, to implement automatic configuration of the port statuses and improve configuration accuracy. Because the port status can be automatically configured, the port status can be modified in time in the case of changes occurring on the port status of the translator.

In an embodiment, the W ports include a first port, a port dataset of the first port includes a port identity of the first port, or the port identity and a clock parameter. The clock parameter is a precision time protocol clock parameter, and is a clock parameter that is sent by a first device and received by the first port. The first device is connected to the first translator.

In an embodiment, the port dataset is sent via a packet.

In an embodiment, the first translator receives the port statuses of the W ports sent by the configuration device, where the port statuses are received via a packet. The first translator sets the port statuses of the W ports based on the received port statuses of the W ports, so that the port statuses of the W ports can be automatically set, improving setting efficiency and precision.

In an embodiment, the first translator receives a target dataset sent by the configuration device, where the target dataset is a dataset determined by the configuration device based on a port dataset and a preset dataset received by the configuration device, and both the preset dataset and the target dataset are precision time protocol datasets. The target dataset is received via a packet. In this way, the first translator may obtain the target dataset. When the first translator sends an Announce packet, a clock parameter in the Announce packet sent by the first translator may be a clock parameter in the target dataset delivered by the configuration device, to provide solutions satisfying corresponding scenarios.

In an embodiment, the first translator receives port identities of the W ports sent by a management device of a communication network, where the port identities of the W ports are generated by the management device based on an identity of a virtual device of the communication network and port numbers of the W ports, the communication network is a network including the N translators, and the port numbers of the W ports are precision time protocol port numbers. The port identities are received via a packet.

In an embodiment, the first translator receives a clock identity of the virtual device of the communication network that is sent by the management device, and separately generates port identities of the W ports based on the clock identity of the virtual device and the port numbers of the W ports. The clock identity of the virtual device is generated by the management device based on the identity of the virtual device of the communication network.

In an embodiment, the management device of the communication network is the configuration device.

In an embodiment, the first translator receives a system-level parameter of the virtual device of the communication network that is sent by the configuration device, where the system-level parameter is a precision time protocol system-level parameter. When sending a packet, the first translator fills the system-level parameter in the packet, where the packet is a precision time protocol packet, and the communication network is a network including the N translators. In this way, when the first translator sends a Sync packet, the system-level parameter in the Sync packet sent by the first translator may be a system-level parameter delivered by the configuration device. In this way, solutions for corresponding scenarios can be met.

In an embodiment, when sending a first announce (Announce) packet through a port in a master state, the first translator fills the target dataset in the first Announce packet; and the first translator sends the first Announce packet through the port in the master state.

In an embodiment, the first translator receives a second Announce packet sent by a second translator, where the second Announce packet includes a stepsRemoved field. The first translator generates a third Announce packet based on the second Announce packet, where a source port identity in the third Announce packet is a port identity of the third Announce packet sent by the first translator. In this way, the first translator writes a port identity of a port sending the third Announce packet into a source port identity field of the to-be-sent Announce packet, so that a TSN device connected to the first translator can learn of the port identity of the third Announce packet sent by the forwarder, facilitating fault locating.

In an embodiment, the second Announce packet includes the stepsRemoved field. The first translator increases the value of the stepsRemoved field by 1, and the third Announce packet includes the stepsRemoved field whose value increases by 1.

In an embodiment, the port status includes a slave state, the master state, or a passive state.

According to a third aspect, an embodiment of this application provides a port status configuration apparatus, configured to perform the method in any one of the first aspect or the possible embodiments of the first aspect. Specifically, the apparatus includes units configured to perform the method in any one of the first aspect or the possible embodiments of the first aspect.

According to a fourth aspect, an embodiment of this application provides a port status configuration apparatus, configured to perform the method in any one of the second aspect or the possible embodiments of the second aspect. Specifically, the apparatus includes units configured to perform the method in any one of the second aspect or the possible embodiments of the second aspect.

According to a fifth aspect, an embodiment of this application provides a port status configuration apparatus. The apparatus includes a transceiver, a processor, and a memory. The transceiver, the processor, and the memory may be connected via an internal connection. The memory is configured to store a program, instructions, or code. The processor is configured to execute the program, the instructions, or the code in the memory and cooperate with the transceiver, so that the apparatus completes the method in any one of the first aspect or the possible embodiments of the first aspect.

According to a sixth aspect, an embodiment of this application provides a port status configuration apparatus. The apparatus includes a transceiver, a processor, and a memory. The transceiver, the processor, and the memory may be connected via an internal connection. The memory is configured to store a program, instructions, or code. The processor is configured to execute the program, the instructions, or the code in the memory and cooperate with the transceiver, so that the apparatus completes the method in any one of the second aspect or the possible embodiments of the second aspect.

According to a seventh aspect, an embodiment of this application provides a computer program product. The computer program product includes a computer program stored in a computer-readable storage medium. The computer program is loaded by a processor to implement the method in any one of the first aspect, the second aspect, the possible embodiments of the first aspect, or the possible embodiments of the second aspect.

According to an eighth aspect, an embodiment of this application provides a computer-readable storage medium for storing a computer program. The computer program is loaded by a processor to execute instructions of the method in any one of the first aspect, the second aspect, the possible embodiments of the first aspect, or the possible embodiments of the second aspect.

According to a ninth aspect, an embodiment of this application provides a port status configuration system, including the apparatus according to the third aspect and the apparatus according to the fourth aspect, or including the apparatus according to the fifth aspect and the apparatus according to the sixth aspect.

DESCRIPTION OF EMBODIMENTS

The following describes embodiments of this application in detail with reference to the accompanying drawings.

Terms in embodiments of the present application including port of a translator, port dataset of a translator, port status of a translator, preset dataset, optimal dataset, target dataset, port identity of a translator, port number of a translator, system-level parameter, and clock parameter are all applicable to the precision time protocol (PTP) (in the IEEE 1588 protocol and a corresponding 1588 profile, for example, IEEE 802.1AS).

Figure 1:
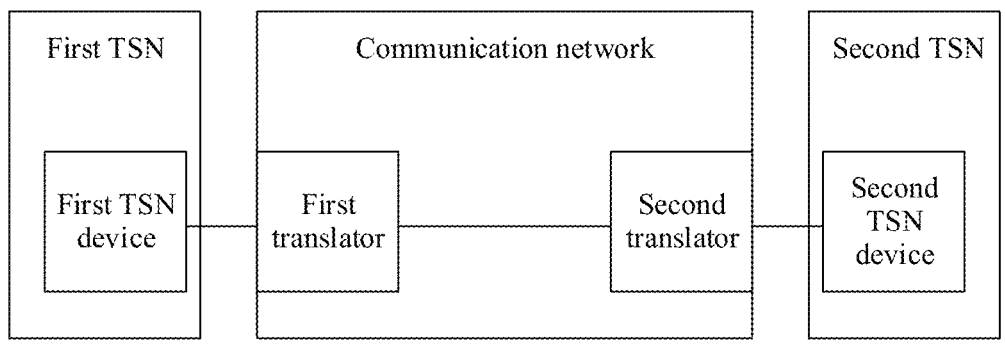
FIG. 1 is a schematic diagram of a network architecture according to an embodiment of this application.

Referring to FIG. 1, an embodiment of this application provides a network architecture. The network architecture includes a communication network and at least two TSNs, and each of the TSNs is connected to the communication network.

The communication network includes N translators, where N is an integer greater than 1. Each TSN device is connected to the translator included in the communication network. For any two translators included in the communication network, a network connection may be established between the two translators. In this way, TSN devices connected to the two translators may communicate with each other via the communication network.

In an embodiment, the communication network is a power network, a 4G network, a 5G network, or the like. The TSN is an Ethernet network, and the TSN includes at least one TSN device.

Each translator in the communication network includes at least one port, and the at least one port is a PTP port. For each TSN, that the TSN is connected to the communication network means that a TSN device in the TSN is connected to a port of the translator. Because the translator may be an independent device or referred to as a dedicated device, or the translator is a module integrated into a device, the translator includes at least one port, which means that a device in which the translator is located includes at least one port.

For example, the network architecture shown in FIG. 1 includes a first TSN and a second TSN, the communication network includes a first translator and a second translator, the first TSN includes a first TSN device, and the second TSN includes a second TSN device. The first TSN device is connected to a port of the first translator, the second TSN device is connected to a port of the second translator, and there is a network connection established between the first translator and the second translator. In this case, the first TSN device and the second TSN device may communicate with each other via the first translator and the second translator.

Figure 2:
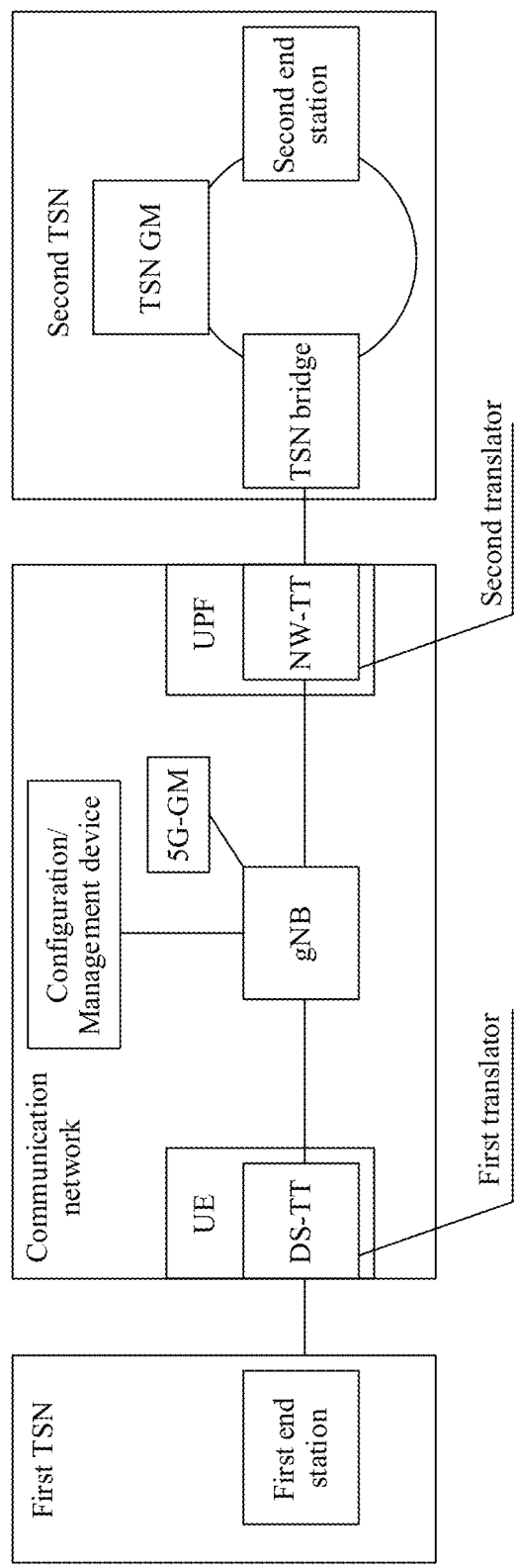
FIG. 2 is a schematic diagram of another network architecture according to an embodiment of this application.
Figure 3:
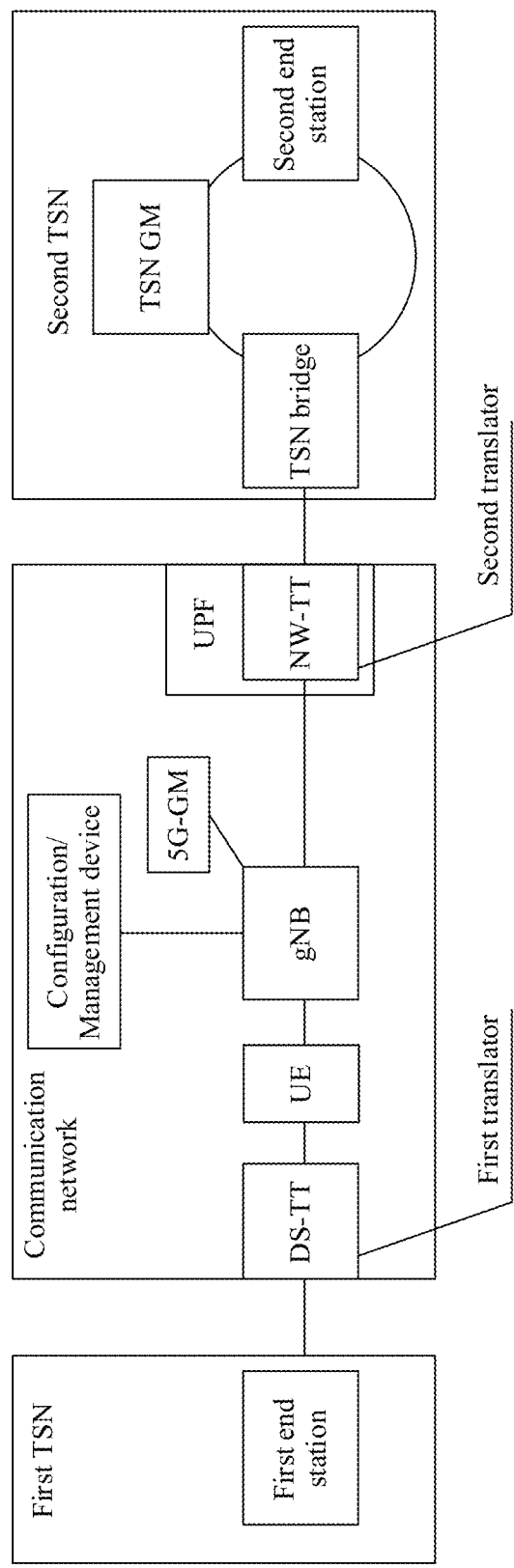
FIG. 3 is a schematic diagram of another network architecture according to an embodiment of this application.
Figure 4:
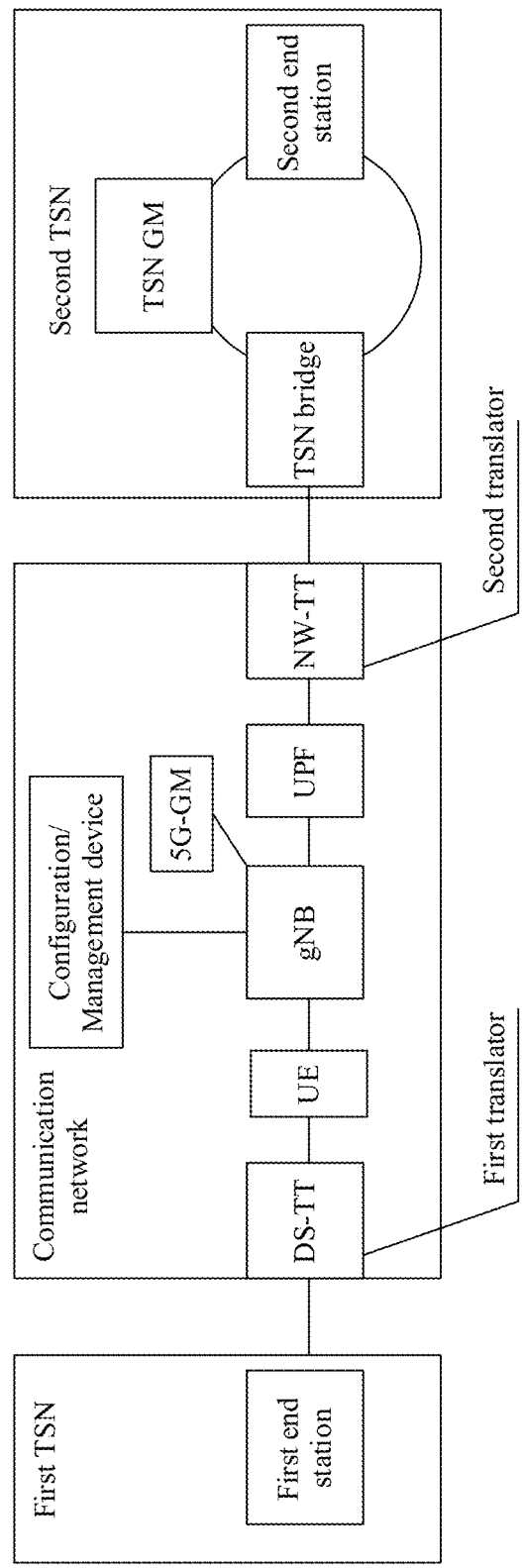
FIG. 4 is a schematic diagram of another network architecture according to an embodiment of this application.

Any TSN includes at least one TSN device. For example, as shown in FIG. 2 to FIG. 4, the first TSN device in the first TSN includes a first end station, and the first end station is connected to a port of the first translator. The second TSN device in the second TSN includes a TSN bridge, a TSN GM, and a second end station. The TSN bridge is connected to a port of the second translator, the TSN GM is connected to the TSN bridge, and the second end station is connected to the TSN bridge and the TSN GM.

In an embodiment, the communication network further includes devices such as user equipment (UE), a user plane function (UPF), a general NodeB (gNB), and a grandmaster (5G GM) clock. One or more translators may be integrated into the UE, as shown in FIG. 2; or the UE may be connected to one or more translators, as shown in FIG. 3 and FIG. 4. One or more translators may be integrated into the UPF, as shown in FIG. 2 and FIG. 3; or the UPF may be connected to one or more translators, as shown in FIG. 4. There is a network connection established between the UPF and the UE. In this way, a network connection between two translators in the communication network may be connected via the network connection between the UE and the UPF.

In an embodiment, any translator in the communication network is a network-side time sensitive network translator (NW-TT) or a device-side time sensitive network translator (DS-TT). For example, as shown in FIG. 2 to FIG. 4, the first translator is a DS-TT, the second translator is an NW-TT, the TSN bridge in the second TSN is connected to a port of the NW-TT, and the first end station in the first TSN is connected to a port of the DS-TT.

In an embodiment, as shown in FIG. 2, FIG. 3, and FIG. 4, the NW-TT may be an independent device, or the NW-TT is integrated into a UPF device; the DS-TT is an independent device, or the DS-TT is integrated into the UE.

In an embodiment, as shown in FIG. 1 to FIG. 4, the communication network further includes a configuration device. The configuration device is an independent device, or is integrated into one of the N translators (not shown), or is located in a same device as one or more of the N translators (not shown). When the communication network is a 5G network, the configuration device may be a 5th generation mobile communication technology generalized precision time protocol (5g-gPTP) device.

For example, in the case that the configuration device is integrated into a translator, the configuration device may be integrated into the NW-TT or the DS-TT. In the case that the configuration device is located in a same device as one or more translators, the configuration device and the one or more NW-TTs are integrated in the UPF, or the configuration device and the one or more DS-TTs are integrated in the UE.

Although FIG. 2 to FIG. 4 show only one DS-TT and one NW-TT, a communication network may include a plurality of DS-TTs and a plurality of NW-TTs. There may also be a plurality of TSN bridges and end stations.

Before each first TSN device in the first TSN communicates with each second TSN device in the second TSN via the first translator and the second translator, the configuration device needs to configure port statuses of ports included in the first translator and port statuses of ports included in the second translator.

Embodiments of this application provide a method for automatically configuring port statuses for a first translator and a second translator. Detailed description about a detailed implementation process in which a configuration device configures port statuses of ports are provided in a subsequent embodiment shown in FIG. 5.

In an embodiment, as shown in FIG. 1 to FIG. 4, the communication network further includes a management device. The management device configures port identities of ports included in translators in the communication network, or the configuration device configures port identities of ports included in translators in the communication network.

In an embodiment, the management device or the configuration device may be integrated into a session management function (SMF) or the UPF. Certainly, the management device or the configuration device may alternatively be integrated into another device in the communication network. The SMF is a management device of the communication network. The management device and the configuration device may be one device, or may be independent devices.

Figure 5:
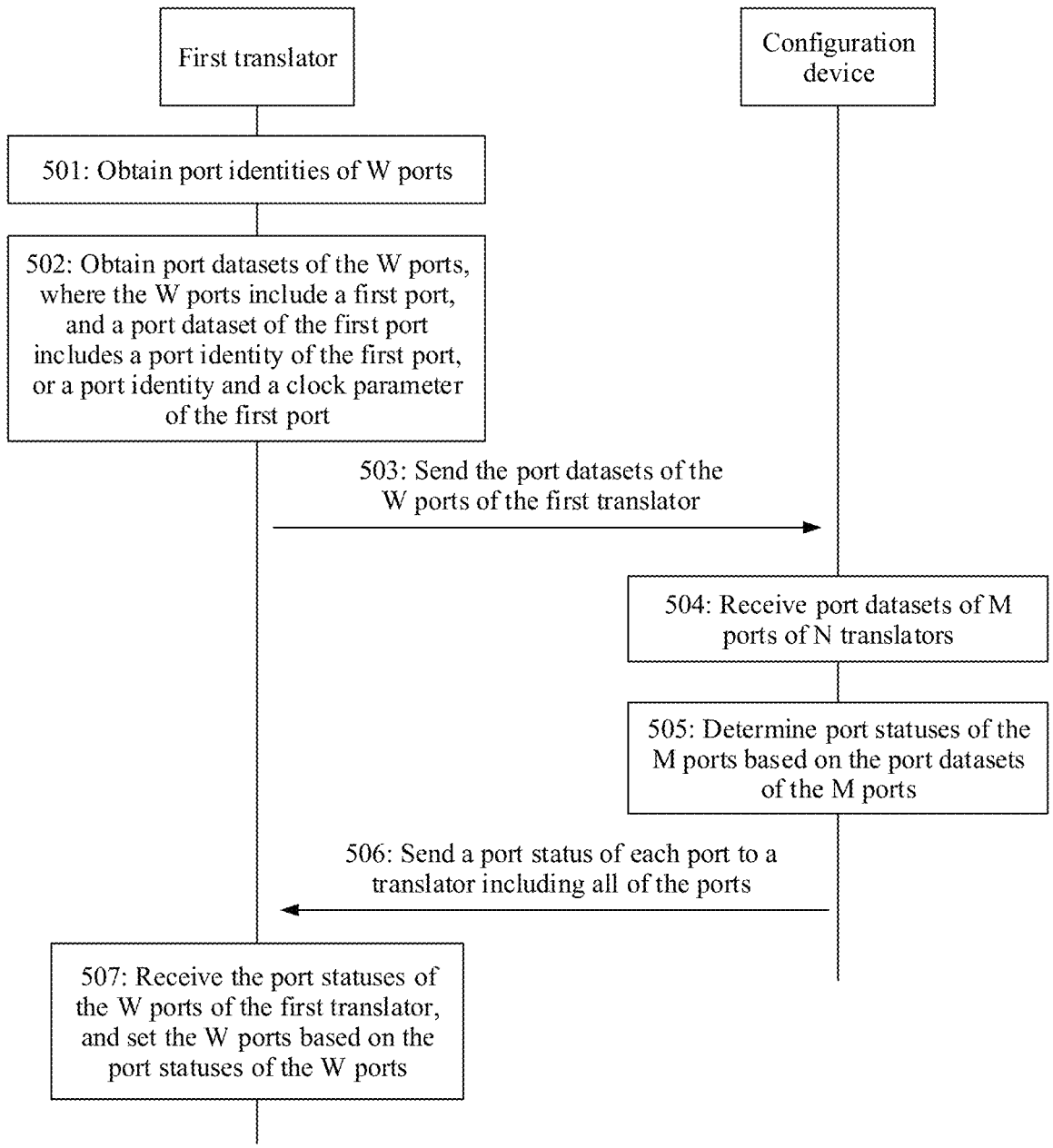
FIG. 5 is a schematic flowchart of a port status configuration method according to an embodiment of this application.

Referring to FIG. 5, an embodiment of this application provides a port status configuration method, applied to the network architecture described in any one of the embodiments in FIG. 1 to FIG. 4. The network architecture includes a communication network and a plurality of TSNs, and each of the TSNs is connected to the communication network. The method includes the following operations.

in operation 501, a first translator obtains port identities of W ports included in the first translator, where W is an integer greater than 0, the first translator is any one of N translators in the communication network, N is an integer greater than 1, and the N translators are integrated into at least two independent devices.

The W ports are PTP ports, and the port identities of the W ports are PTP port identities. W may be a quantity of all PTP ports in the first translator, or may be a quantity of some PTP ports in the first translator. For example, if the first translator includes 10 PTP ports, W may be less than or equal to 10.

In an embodiment, the first translator can obtain, in the following two manners, the port identities of the W ports included in the first translator, where the port identities of the W ports are PTP port identities. The two manners are as follows:

In manner 1, the first translator receives the port identities of the W ports sent by a configuration device or a management device, where the port identities of the W ports are generated by the configuration device or the management device.

In an embodiment, the configuration device or the management device generates the port identities of the W ports based on an identity of a virtual device of the communication network and port numbers of the W ports, and sends the port identities of the W ports to the first translator. The first translator receives the port identities of the W ports.

In an embodiment, the port numbers of the W ports are PTP port numbers. For a same port, a value of the PTP port number may be the same as or different from a value of another protocol port number.

The communication network may be virtualized into a virtual device. For example, when the communication network is a 5G network, the virtual device may be referred to as a 5G system bridge (5GS Bridge). The identity of the virtual device of the communication network is an identity of the virtual device. The identity of the virtual device may be a media access control (MAC) address, an organizationally unique identity (OUI) code, or the like.

In an embodiment, the management device or the configuration device includes the port numbers of the W ports in the first translator. The port numbers of the W ports are configured by the management device or the configuration device for the first translator in advance, or are obtained by the management device or the configuration device from the first translator.

In an embodiment, in manner 1, the configuration device or the management device generates a clock identity of the virtual device of the communication network based on the identity of the virtual device of the communication network, and separately generates the port identities of the W ports based on the clock identity and the port numbers of the W ports.

In an embodiment, for any one of the W ports, the configuration device or the management device combines the clock identity of the virtual device and a port number of the port into a port identity of the port. A length of the port identity of the port is equal to a sum of a length of the clock identity of the virtual device and a length of the port number of the port. For the remaining W−1 ports, the configuration device or the management device generates port identities of the remaining W−1 ports in the foregoing same manner.

For example, it is assumed that the length of the clock identity of the virtual device is 8 bytes, and the length of the port number of the port is 2 bytes. The management device or the configuration device combines the clock identity of the virtual device and the port number of the port into a port identity with a length of 10 bytes.

Optionally, the management device sends the port identity to the first translator via a port identity packet. To be specific, when generating the port identities of the W ports of the first translator, the management device sends a port identity packet to the first translator, where the port identity packet includes port identities and the port numbers of all the ports of the first translator. In this way, the first translator receives the port identity packet, and sets the port identities of the W ports based on the port identities and the port numbers of the W ports that are included in the port identity packet.

In an embodiment, the configuration device and the first translator may be located in a same device or located in different devices.

In an embodiment, when the configuration device and the first translator are located in a same device, the configuration device may be integrated with the first translator, or the configuration device and the first translator may be integrated in UE or a UPF, and the configuration device and the first translator are connected via an internal connection. In this case, when generating the port identities of the W ports of the first translator, the configuration device sends the port identities and the port numbers of the W ports to the first translator via the internal connection. The first translator receives the port identities and the port numbers of the W ports via the internal connection, and sets the port identities of the W ports based on the port identities and the port numbers of the W ports.

In an embodiment, when the configuration device and the first translator are located in different devices, the configuration device sends the port identity to the first translator via a port identity packet. To be specific, when generating the port identities of the W ports of the first translator, the configuration device sends the port identity packet to the first translator, where the port identity packet includes the port identities and the port numbers. In this way, the first translator receives the port identity packet, and sets the port identities of the W ports based on the port identities and the port numbers of the W ports that are included in the port identity packet.

In an embodiment, referring to a port identity packet shown in Table 1. The port identity packet includes a packet header and a payload part. The packet header includes a MAC header and an internet protocol (IP) header, or includes only a MAC header. A destination address included in the IP header or the MAC header is an address of the first translator. Optionally, the payload part includes a correspondence between a port number of each of the W ports and a port identity corresponding to the port. Optionally, referring to Table 1. Two adjacent fields are used to carry the record in the payload part. That is, for the two adjacent fields, one field carries a port number of a port, and the other field carries a port identity of the port.

Because the port identity packet may include port numbers of a plurality of ports and a plurality of corresponding port identities, this avoids that the management device or the configuration device needs to separately send the port identity packet to each port of the first translator.

TABLE 1

| Port identity packet | | |
|---|---|---|
| Field | Length (Bytes) | Notes |
| MAC header | 14 | MAC packet header |
| IP header | 28 | IPv4 or IPv6 packet header |
| Port number | 2 | PTP port number of a first translator (DS-TT or NW-TT) |
| Port identity | 10 | PTP port identity of a PTP port of the first translator (DS-TT or NW-TT) |

For the remaining N−1 translators in the communication network, each of the N−1 translators obtains, in manner 1, the port identities of the ports included in respective translators.

In manner 2, the first translator receives the clock identity of the virtual device of the communication network that is sent by the configuration device or the management device, and separately generates the port identities of the W ports based on the clock identity and the port numbers of the W ports.

In an embodiment, in manner 2, the configuration device or the management device generates a clock identity of a virtual device of the communication network based on an identity of the virtual device of the communication network, and sends the clock identity of the virtual device to the first translator. The first translator receives the clock identity of the virtual device, and separately generates the port identities of the W ports based on the clock identity of the virtual device and the port numbers of the W ports.

In an embodiment, for any one of the W ports, the first translator combines the clock identity of the virtual device and a port number of the port into a port identity of the port. A length of the port identity of the port is equal to a sum of a length of the clock identity of the virtual device and a length of the port number of the port. For the remaining W−1 ports, the first translator generates port identities of the remaining W−1 ports in the foregoing same manner.

In an embodiment, the management device sends the clock identity to the first translator via a clock identity packet. To be specific, when generating the clock identity, the management device sends the clock identity packet to the first translator, where the clock identity packet includes the clock identity of the virtual device.

In an embodiment, the configuration device and the first translator may be located in a same device or located in different devices. When the configuration device and the first translator are located in a same device, the configuration device and the first translator are connected via an internal connection. In this case, when generating the clock identity of the virtual device, the configuration device sends the clock identity to the first translator via the internal connection. When the configuration device and the first translator are located in different devices, the configuration device sends the clock identity to the first translator via a clock identity packet. To be specific, when generating the clock identity of the virtual device, the configuration device sends the clock identity packet to the first translator, where the clock identity packet includes the clock identity of the virtual device.

In an embodiment, referring to a clock identity packet shown in Table 2, the clock identity packet includes a packet header and a payload part. The packet header includes a MAC header and an IP header, or includes only a MAC header. A destination address included in the IP header or the MAC header is an address of the first translator. The payload part includes the clock identity of the virtual device. By comparing the port identity packet shown in Table 1 with the clock identity packet shown in Table 2, the clock identity packet does not need to include the port identities and the port numbers of all the ports, reducing a length of a sent packet and reducing the occupation of network resources.

TABLE 2

Clock identity packet

| Field | Length (Bytes) | Notes |
|---|---|---|
| MAC header | 14 | MAC packet header |
| IP header | 28 | IPv4 or IPv6 packet header |
| Clock identity | 8 | PTP clock identity of the virtual device of the communication network on which the first translator (DS-TT or NW-TT) is located |

For the remaining N−1 translators in the communication network, the configuration device or the management device also sends the clock identity of the virtual device to each of the N−1 translators. In this way, each of the N−1 translators obtains, in manner 2, a port identity of a port included in each of the N−1 translators.

Subsequently, port statuses of ports of the N translators need to be configured. It is assumed that the N translators include M ports, and the M ports are PTP ports. The port statuses of the M ports may be configured in the following procedure, where the port statuses of the M ports are PTP port statuses.

In operation 502, the first translator obtains port datasets of the W ports of the first translator, where the W ports include a first port, and a port dataset of the first port includes a port identity of the first port, or a port identity and a clock parameter of the first port.

In an embodiment, the clock parameter is a PTP clock parameter. The port datasets of the W ports are PTP port datasets.

In this operation, the first port of the first translator is connected to a first device. If the first port of the first translator receives an Announce packet sent by the first device, the Announce packet carries a clock parameter, and the port dataset of the first port obtained by the first translator includes the port identity of the first port and the clock parameter carried in the Announce packet. If the first port of the first translator does not receive the Announce packet sent by the first device, the port dataset of the first port obtained by the first translator includes the port identity of the first port. In this case, the clock parameter in the port dataset of the first port may be an empty set.

The first device is a TSN device connected to the first port. For example, when the first translator is an NW-TT, the first device connected to a first port of the NW-TT may be a TSN bridge. The first port of the NW-TT may receive an Announce packet that carries a clock parameter and sent by the TSN bridge, or may not receive an Announce packet that carries a clock parameter and sent by the TSN bridge. The NW-TT obtains the port dataset of the first port based on the case in which the first port receives the Announce packet.

Similarly, referring to FIG. 2 to FIG. 4. When the first translator is a DS-TT, the first device connected to a first port of the DS-TT may be an end station. The first port of the DS-TT may receive an Announce packet that carries a clock parameter and sent by the end station, or may not receive an Announce packet that carries a clock parameter and sent by the end station. The DS-TT obtains the port dataset of the first port based on the case in which the first port receives the Announce packet.

In an embodiment, the clock parameter includes one or more of the following: domainNumber, MinorVersionPTP, majorSdoId, minorSdoId, grandmasterPriority1, grandmasterIdentity, grandmasterClockQuality, grandmastermasterPriority2, stepsRemoved, sourcePortIdentity, flags, currentUtcOffset, timeSource, and Path trace TLV.

A manner of obtaining the port dataset of each of the other W−1 ports by the first translator is the same as the foregoing manner of obtaining the port dataset of the first port by the first translator.

Each of the other N−1 translators in the communication network performs this operation in the same manner as the first translator, to obtain the port dataset of the respective port.

In operation 503, the first translator sends the port datasets of the W ports of the first translator to the configuration device.

In an embodiment, when the configuration device and the first translator are located in a same device, the configuration device and the first translator are connected via an internal connection. In this case, the first translator sends the port datasets of the W ports of the first translator to the configuration device via the internal connection.

When the configuration device and the first translator are located in different devices, the first translator sends the port dataset to the configuration device via a packet. In an embodiment, after obtaining the port dataset of the first port, the first translator sends a port dataset packet of the first port to the configuration device, where the port dataset packet carries the port dataset of the first port. When obtaining the port dataset of each of the other W−1 ports, the first translator sends, like the first port, the port dataset packet of each port to the configuration device.

In an embodiment, the first translator may alternatively send port datasets of a plurality of ports of the W ports included via a same packet.

In an embodiment, when the port dataset of the first port includes the port identity and the clock parameter of the first port, a structure of the port dataset packet sent by the first translator is shown in Table 3. The port dataset packet includes a packet header and a payload part. The packet header includes a MAC header and an IP header, or includes only a MAC header. The payload part includes the port identity and the clock parameter of the first port. The payload part further includes a flag, where the flag identifies that the port dataset of the first port includes a received clock parameter.

TABLE 3

Port dataset packet (where a port receives an Announce packet)

| Field | Length (Bytes) | Notes |
|---|---|---|
| MAC header | 14 | MAC packet header |
| IP header | 28 | IPv4 or IPv6 packet header |
| portIdentity | 10 | Port ID for reporting an Erbest dataset |
| Flag | 1 | Bit 0 indicates whether a local port receives the Announce packet, and other bits are reserved |
| domainNumber | 1 | Obtained from the received Announce packet |
| MinorVersionPTP/ version PTP | 1 | Obtained from the received Announce packet |
| majorSdoId | 1 | Obtained from the received Announce packet, where least significant four bits are reserved |
| minorSdoId | 1 | Obtained from the received Announce packet |
| grandmasterPriority 1 | 1 | Obtained from the received Announce packet |
| grandmasterIdentity | 8 | Obtained from the received Announce packet |
| grandmasterClockQuality | 4 | Obtained from the received Announce packet |
| grandmasterPriority 2 | 1 | Obtained from the received Announce packet |
| stepsRemoved | 2 | Obtained from the received Announce packet |
| sourcePortIdentity | 10 | Obtained from the received Announce packet |
| flags | 2 | Obtained from the received Announce packet |
| currentUtcOffset | 2 | Obtained from the received Announce packet |
| timeSource | 1 | Obtained from the received Announce packet |
| Path trace TLV | 4 + 8*X | Obtained from the received Announce packet, where X indicates stepsRemoved between a device that sends the Announce packet and a clock source of the device |

In an embodiment, when the first port does not receive the Announce packet and the port dataset of the first port includes the port identity of the first port, a structure of the port dataset packet sent by the first translator is shown in Table 4. The port dataset packet includes a packet header and a payload part. The packet header includes a MAC header and an IP header, or includes only a MAC header. The payload part includes the port identity of the first port and a flag Flag, where the flag identifies that the port dataset of the first port does not include the clock parameter (that is, the clock parameter is an empty set).

In an embodiment, in this case, a field carrying the clock parameter in the payload part carries an empty set. That the field carries an empty set means that a value of each bit in the field is 0, 1, or the like.

TABLE 4

Port dataset packet (where a port does not receive an Announce packet)

| Field | Length (Bytes) | Notes |
|---|---|---|
| MAC header | 14 | MAC packet header |
| IP header | 28 | IPv4 packet header |
| portIdentity | 10 | Port ID for reporting an Erbest dataset |
| Flag | 1 | Bit 0 indicates whether a local port receives the Announce packet, and other bits are reserved. |

In an embodiment, when the first port does not receive the Announce packet, the first translator may not send the port dataset of the first port to the configuration device, reducing a quantity of packets exchanged between the first translator and the configuration device.

Each of the other N−1 translators in the communication network performs this operation as the first translator does, to send the port dataset of the port included in each translator to the configuration device. A quantity of port datasets sent by the N translators is M, meaning that the N translators send port datasets of M ports in total, where M is an integer greater than 1.

In operation 504, the configuration device receives the port datasets of the M ports of the N translators.

The first translator is still used as an example to describe this operation in detail. When the configuration device and the first translator are located in a same device, the configuration device is connected to the first translator via an internal connection, and the configuration device receives the port datasets of the W ports of the first translator via the internal connection. When the configuration device and the first translator are located in different devices, the configuration device receives port dataset packets of the W ports sent by the first translator, and obtains the port dataset of each port from the port dataset packet of each port.

In an embodiment, port datasets of a plurality of ports may be combined for sending via one port dataset packet.

Similar to the manner of receiving the port dataset of the first translator, the configuration device receives the port dataset sent by each of the other N−1 translators in the communication network.

In operation 505, the configuration device determines the port statuses of the M ports based on the port datasets of the M ports, where the port statuses of the M ports are PTP port statuses.

In this operation, the configuration device determines the port statuses of the M ports based on the port datasets of the M ports and a preset dataset. Optionally, the preset dataset is a preset PTP dataset. The preset dataset includes a clock parameter but does not include a port identity.

In an embodiment, the preset dataset is a dataset of the virtual device of the communication network.

In an embodiment, the preset dataset is stored locally in the configuration device, and the configuration device locally obtains the preset dataset for determining the port status. Alternatively, the preset dataset is stored in a device other than the configuration device, where the device may be a server or the like. The configuration device obtains the preset dataset from the device for determining the port status.

In an embodiment, this operation provides the following instance of determining a port status.

The configuration device selects an optimal dataset from the port datasets of the M ports, and compares the optimal dataset with the preset dataset. When determining that the optimal dataset is better than the preset dataset, the configuration device determines that a port state of a port corresponding to the optimal dataset is a slave state, and determines that a state of each of the other M−1 ports is a master state or a passive state. When determining that the preset dataset is better than the optimal dataset, the configuration device determines that a state of each of the M ports is a master state or a passive state.

In an embodiment, the configuration device selects the optimal dataset from the port datasets of the M ports using a BMC algorithm, and compares the optimal dataset with the preset dataset.

In an embodiment, when determining the port statuses of the M ports, the configuration device may further perform the following operation:

The configuration device generates a target dataset based on the optimal dataset when the optimal dataset is better than the preset dataset, where a value of a stepsRemoved field in the target dataset is greater than a value of a stepsRemoved field in the optimal dataset by 1, and the target dataset is a precision time protocol dataset; and uses the preset dataset as the target dataset when the preset dataset is better than the optimal dataset.

In an embodiment, the operation that the configuration device generates the target dataset based on the optimal dataset may be performed as follows.

The configuration device increases the value of the stepsRemoved field of the optimal dataset by 1 and removes port identities from the optimal dataset, and then uses the optimal dataset as the target dataset. Alternatively, the configuration device uses the optimal dataset as the target dataset, increases the value of the stepsRemoved field in the target dataset by 1, and removes port identities from the target dataset.

In operation 506, the configuration device sends a port status of each of the M ports to a translator including all of the ports, where the configuration device sends the port status via a packet.

The first translator is still used as an example to describe this operation. For the other N−1 translators, refer to the description of the first translator. In this example, the first translator includes W ports, and the implementation process in which the configuration device sends port statuses of the W ports to the first translator may be performed as follows.

When the configuration device and the first translator are located in a same device, the configuration device is connected to the first translator via an internal connection. The configuration device sends the port status and the port identity of each of the W ports, or the port status and the port number of each port to the first translator via the internal connection. When the configuration device and the first translator are located in different devices, the configuration device sends a configuration packet to the first translator. The configuration packet includes a correspondence between a port status of each of the W ports and a port identity of the corresponding port, or a correspondence between a port status of each port and a port number of the corresponding port.

In an embodiment, two adjacent fields are used to carry the record in the configuration packet. That is, for the two adjacent fields, one field carries a port identity of a port, and the other field carries a port status of the port.

In an embodiment, two adjacent fields are used to carry the record in the configuration packet. That is, for the two adjacent fields, one field carries a port number of a port, and the other field carries a port status of the port.

In an embodiment, the configuration device further sends the target dataset to the N translators, where the target dataset is sent via a packet.

In an embodiment, the target dataset and the determined port status are included in a same packet, or included in different packets.

The first translator is still used as an example to describe the process of sending the target dataset. For the other N−1 translators, refer to the description of the first translator. In this example, the implementation process in which the configuration device sends the target dataset to the first translator may be performed as follows.

In an embodiment, when the configuration device and the first translator are located in a same device, the configuration device sends the target dataset to the first translator via an internal connection. When the configuration device and the first translator are located in different devices, the configuration device sends a dataset configuration packet to the first translator, where the dataset configuration packet carries the target dataset. Alternatively, the configuration device sends a configuration packet to the first translator, where the configuration packet not only includes the port status and the port identity of each of the W ports, but also carries the target dataset; or the configuration packet not only includes the port status and the port number of each of the W ports, but also carries the target dataset.

In operation 507, the first translator included in the N translators receives port statuses of the W ports of the first translator, and sets the W ports based on the port statuses of the W ports.

In this operation, when the configuration device and the first translator are located in a same device, the first translator receives the port status and the port identity of each of the W ports via the internal connection; and sets the port status of each port based on the received port status and port identity of each port. Alternatively, the first translator receives the port status and the port number of each of the W ports via the internal connection; and sets the port status of each port based on the received port status and the port number of each port.

In an embodiment, the configurator further sends the target dataset via the internal connection, and stores the target dataset.

When the configuration device and the first translator are located in different devices, the first translator receives a configuration packet sent by the configuration device, where the configuration packet includes the port statuses and the port identities of the W ports, and sets the port status of each port based on the port status and the port identity of each port in the configuration packet. Alternatively, the configuration packet includes the port statuses and the port numbers of the W ports, and the first translator sets the port status of each port based on the port status and the port number of each port in the configuration packet.

In an embodiment, the configuration packet further includes the target dataset, and the first translator further stores the target dataset.

In an embodiment, the first translator may further receive the dataset configuration packet sent by the configuration device, where the dataset configuration packet carries the target dataset. The first translator may further store the target dataset.

In an embodiment, the configuration device further obtains a system-level parameter of the virtual device of the communication network, and further sends the system-level parameter to the N translators.

In an embodiment, the system-level parameter is a PTP system-level parameter.

In an embodiment, the system-level parameter of the virtual device may be information defined in a communication protocol used by the configuration device, and the configuration device may store the system-level parameter of the virtual device before delivery. Alternatively, technical engineers pre-configure the system-level parameter of the virtual device on the configuration device, and the configuration device stores the system-level parameter of the virtual device.

In an embodiment, the first translator is still used as an example to describe the process in which the configuration device sends the system-level parameter. The process may be performed as follows. In a case that the configuration device and the first translator are located in a same device, the configuration device sends the system-level parameter to the first translator via an internal connection, and the first translator receives and stores the system-level parameter via the internal connection. In a case that the configuration device and the first translator are located in different devices, the configuration device sends a parameter packet to the first translator, where the parameter packet carries the system-level parameter, and the first translator receives the parameter packet and stores the system-level parameter carried in the parameter packet.

In an embodiment, the system-level parameter includes one or more of the following: domainNumber, MinorVersionPTP, majorSdoId, minorSdoId, sourcePortIdentity, or flags.

In an embodiment, when sending a packet, the first translator fills the system-level parameter in the packet, where the packet is a PTP packet, and sends the packet to a TSN device connected to the first translator. The packet is an announce (Announce) packet, a synchronization (Sync) packet, a follow up packet, a Pdelay packet, or the like.

The Pdelay packets include a Pdelay_request packet, a Pdelay_response packet, and a Pdelay_response_Follow_up packet. The first translator may send the Pdelay packet to the TSN device connected to the first translator, where the Pdelay packet is for measuring a delay and a frequency offset between the first translator and the TSN device.

Figure 6:
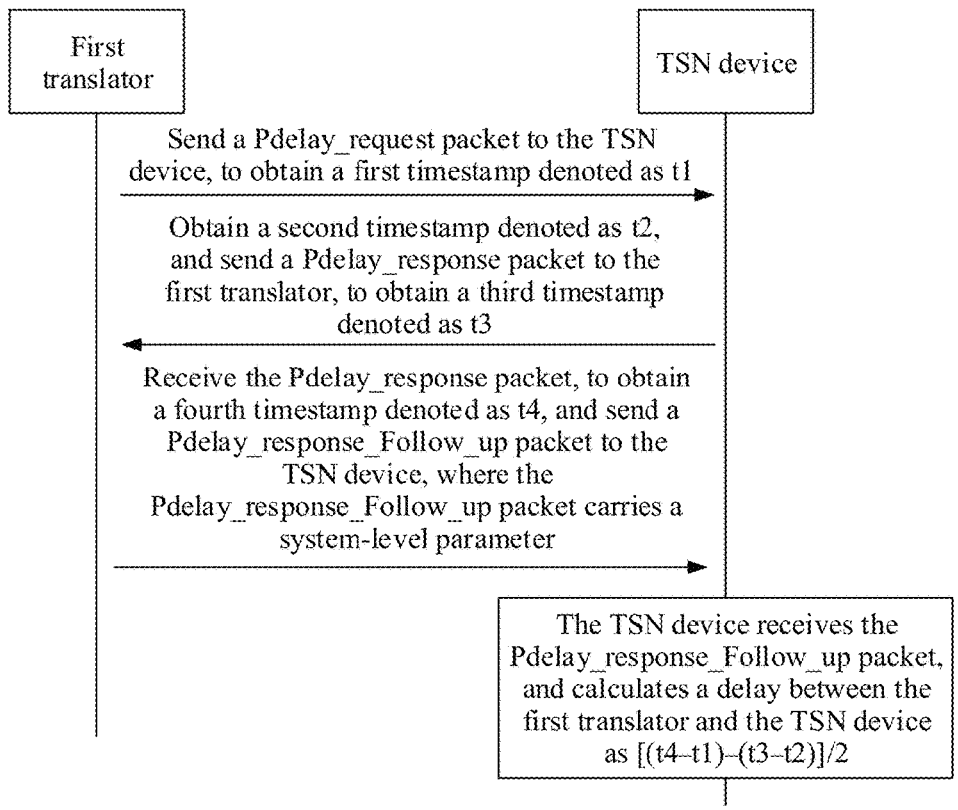
FIG. 6 is a schematic flowchart of transmitting a Pdelay packet according to an embodiment of this application.

Refer to a process of sending a Pdelay packet shown in FIG. 6. The process is for measuring a delay by the first translator. The first translator sends the Pdelay_request packet to the TSN device, to obtain a first timestamp denoted as t1, where the first timestamp t1 is a timestamp at which the Pdelay_request packet is sent, and the Pdelay_request packet carries the system-level parameter. The TSN device receives the Pdelay_request packet, to obtain a second timestamp denoted as t2, where the second timestamp t2 is a timestamp at which the Pdelay_request packet is received, and sends the Pdelay_response packet to the first translator, to obtain a third timestamp denoted as t3, where the first timestamp t3 is a timestamp at which the Pdelay_response packet is sent. The first translator receives the Pdelay_response packet, to obtain a fourth timestamp denoted as t4, where the fourth timestamp t4 is a timestamp at which the Pdelay_response packet is received, and sends the Pdelay_response_Follow_up packet to the TSN device, where the Pdelay_response_Follow_up packet carries the system-level parameter. The TSN device receives the Pdelay_response_Follow_up packet, and calculates a delay between the first translator and the TSN device as $[(t4-t1)-(t3-t2)]/2$.

In an embodiment, when the first translator sends the Pdelay packet through a port connected to the TSN device, a port state of the port is a master state, a slave state, a passive state, or the like.

In an embodiment, a packet header of the Pdelay packet carries the system-level parameter.

In an embodiment, in the instance shown in FIG. 6, the first translator is an NW-TT, and the TSN device is a TSN bridge; or the first translator is a DS-TT, and the TSN device is an end station.

For a Sync packet, the first translator may generate the Sync packet, and send the Sync packet to the TSN device through a port in a master state, where the TSN device is connected to the port. A packet header of the Sync packet carries the system-level parameter.

In an embodiment, after sending the Sync packet, the first translator further immediately generates a Follow up packet, and sends the Follow up packet to the TSN device through the port in the master state. A packet header of the Follow up packet carries the system-level parameter.

For an Announce packet, the first translator may generate a first Announce packet, where the first Announce packet carries the system-level parameter and a target dataset, and send the first Announce packet to the TSN device through a port in a master state, where the TSN device is connected to the port. A packet header of the first Announce packet carries the system-level parameter, and a payload part of the first Announce packet carries the target dataset.

For an instance of the Sync packet or the Announce packet, the first translator is a DS-TT, the TSN device is an end station, and the end station is connected to a port in a master state of the DS-TT.

In an embodiment, the first translator may further receive a packet sent by a second translator, where the packet includes a system-level parameter, and the second translator is one of the N translators other than the first translator. The first translator may store the system-level parameter sent by the second translator. In this way, when the first translator generates a packet (including the Announce packet, the Sync packet, the Follow up packet, or the Pdelay packet), a system-level parameter carried in the generated packet may be the system-level parameter sent by the configuration device or the system-level parameter in the received packet sent by the second translator.

In an embodiment of this application, because the N translators send the port datasets of the M ports to the configuration device, the configuration device may receive the port datasets of the M ports, determine the port statuses of the M ports based on the port datasets of the M ports, and send the port status of each port to the translator including all of the ports, so that the port statuses of the M ports are automatically configured for the N translators. This improves configuration efficiency and configuration accuracy.

After the port statuses of the M ports of the N translators are configured, the TSN device may obtain a time and quality level of the TSN device by using the translator in the communication network, and the time and quality level may be transferred via a PTP packet. For example, refer to FIG. 2 to FIG. 4. The first TSN device is connected to the port of the first translator, and the second TSN device is connected to the port of the second translator. It is assumed that a port that is of the first translator and that is connected to the first TSN device is in a master state, and a port that is of the second translator and that is connected to the second TSN device is in a slave state. In this case, the second TSN device may send a time and quality level of the second TSN device or a time and quality level of a tracing source of the second TSN device to the first TSN device via the second translator and the first translator.

In an embodiment, the first translator is a DS-TT, the first TSN device is an end station, the second translator is an NW-TT, and the second TSN device is a TSN bridge. To be specific, a port that is of the NW-TT and that is connected to the TSN bridge is a port in a slave state, and a port that is of the DS-TT and that is connected to the end station is a port in a master state. In this case, the TSN bridge may send a time and quality level of the TSN bridge or a time and quality level of a tracing source of the TSN bridge to the end station via the NW-TT and the DS-TT. Alternatively, the first translator is an NW-TT, the first TSN device is a TSN bridge, the second translator is a DS-TT, and the second TSN device is an end station, a TSN bridge, or a TSN GM. To be specific, a port that is of the NW-TT and that is connected to the TSN bridge is a port in a master state, and the port that is of the DS-TT and that is connected to the end station is a port in a slave state. In this case, the second TSN device may send a time and quality level of the second TSN device or a time and quality level of a tracing source of the second TSN device to the TSN bridge via the DS-TT and the NW-TT.

Figure 7:
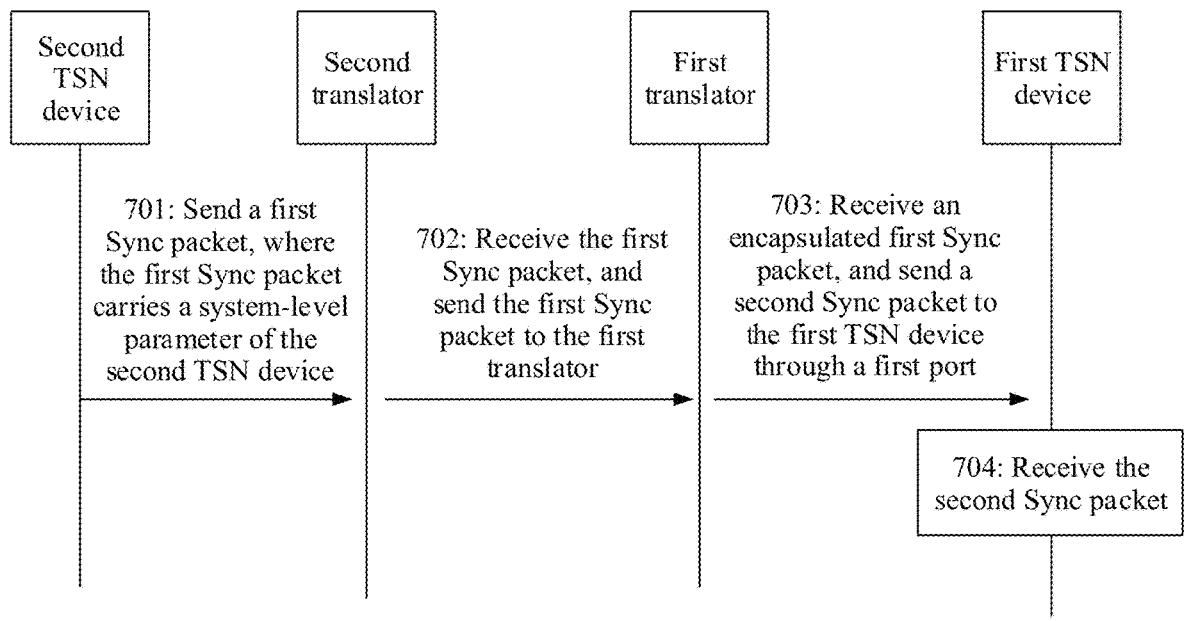
FIG. 7 is a schematic flowchart of sending a PTP time according to an embodiment of this application.

Referring to FIG. 7, a process in which a second TSN device sends a PTP time to a first TSN device via a second translator and a first translator may be performed as follows.

In operation 701, the second TSN device sends a first Sync packet to the second translator, where the first Sync packet carries a system-level parameter of the second TSN device.

After sending the first Sync packet to the second translator, the second TSN device further sends a first Follow up packet to the second translator, where the first Follow up packet also carries the system-level parameter of the second TSN device.

A PTP packet header of the first Sync packet carries the system-level parameter of the second TSN device, and a PTP packet header of the first Follow up packet also carries the system-level parameter of the second TSN device.

In operation 702, the second translator receives the first Sync packet, and sends the first Sync packet to the first translator.

In an embodiment, after receiving the first Sync packet, the second translator encapsulates the first Sync packet, that is, uses the first Sync packet as a payload part, adds a packet header to the payload part, where the packet header includes a MAC header and/or an IP header, and sends an encapsulated first Sync packet to the first translator.

In an embodiment, after receiving the first Sync packet, the second translator may further receive the first Follow up packet, encapsulate the first Follow up packet, that is, use the first Follow up packet as a payload part, add a packet header to the payload part, where the packet header includes a MAC header and/or an IP header, and send an encapsulated first Follow up packet to the first translator.

In operation 703, the first translator receives the encapsulated first Sync packet, and sends a second Sync packet to the first TSN device through a first port, where a source port identity of the second Sync packet is a port identity of the first port, the second Sync packet carries a system-level parameter, and the first port is a port that is of the first translator and that is connected to the first TSN device.

In an embodiment, the first translator receives the encapsulated first Sync packet, decapsulates the encapsulated first Sync packet to obtain the first Sync packet, and generates the second Sync packet. The source port identity of the second Sync packet is the port identity of the first port. A system-level parameter carried in a PTP packet header of the second Sync packet is the system-level parameter carried in the PTP packet header of the first Sync packet. Alternatively, a system-level parameter carried in a PTP packet header of the second Sync packet is a system-level parameter sent by a configuration device and received by the first translator.

In an embodiment, the first translator may further receive the encapsulated first Follow up packet, decapsulate the encapsulated first Follow up packet to obtain the first Follow up packet, and generate a second Follow up packet. A source port identity of the second Follow up packet is the port identity of the first port. A system-level parameter carried in a PTP packet header of the second Follow up packet is the system-level parameter carried in the PTP packet header of the first Follow up packet. Alternatively, a system-level parameter carried in a PTP packet header of the second Follow up packet is the system-level parameter sent by the configuration device and received by the first translator.

In operation 704, the first TSN device receives the second Sync packet.

In an embodiment, the first TSN device further receives the second Follow up packet.

In this embodiment of this application, when sending a Sync packet, the first translator writes a port identity of a port for sending the Sync packet into a source port identity field of the to-be-sent Sync packet, so that the first TSN device may learn of the port identity of the Sync packet sent by the first forwarder, facilitating fault locating. In addition, the system-level parameter in the Sync packet sent by the first translator may be a system-level parameter in the Sync packet sent by the second translator and received by the first translator, or may be a system-level parameter delivered by the configuration device. In this way, different scenarios may be met.

Figure 8:
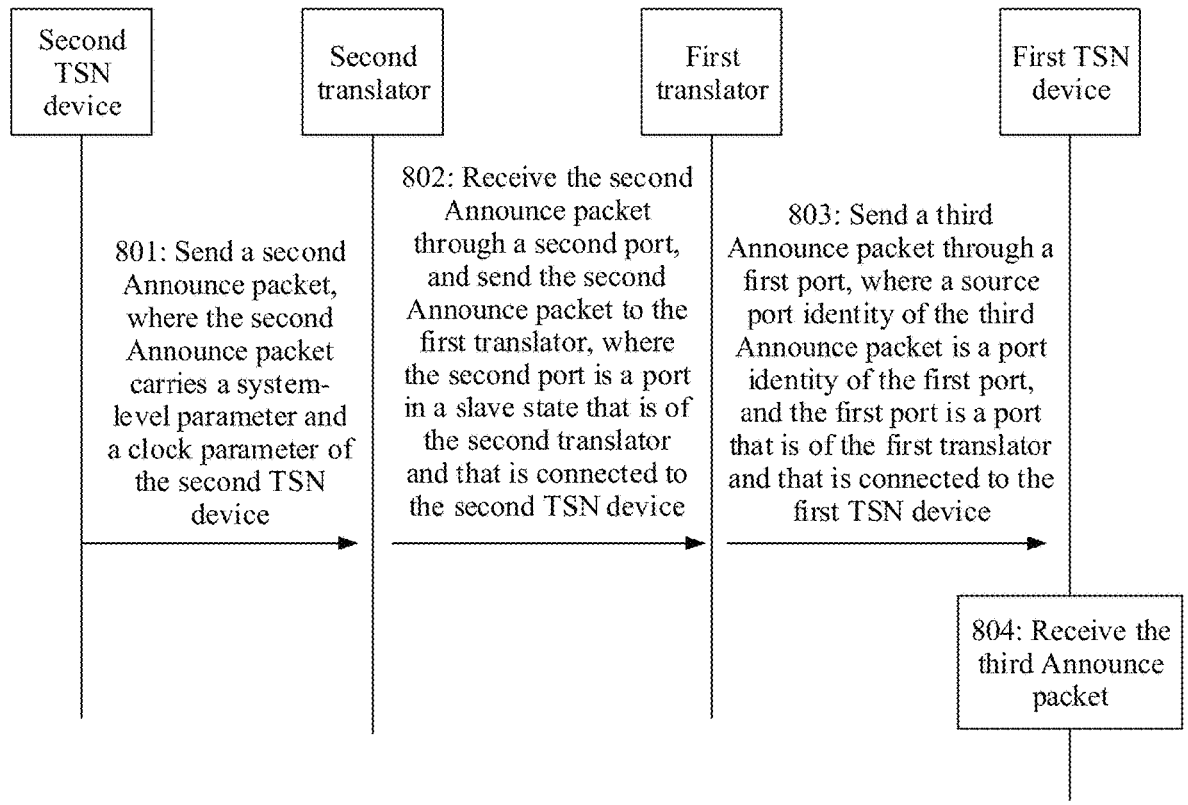
FIG. 8 is another schematic flowchart of sending a PTP time according to an embodiment of this application.

Referring to FIG. 8, a process in which a second TSN device sends a PTP time of the second TSN device to a first TSN device via a second translator and a first translator may be performed as follows.

In operation 801, the second TSN device sends a second Announce packet to the second translator, where the second Announce packet carries a system-level parameter and a clock parameter of the second TSN device.

A PTP packet header of the second Announce packet carries the system-level parameter of the second TSN device. A payload part of the second Announce packet carries the clock parameter of the second TSN device. The clock parameter includes a stepsRemoved field.

In operation 802, the second translator receives the second Announce packet through a second port, and sends the second Announce packet to the first translator, where the second port is a port in a slave state that is of the second translator and that is connected to the second TSN device.

In an embodiment, the second translator increases a value of the stepsRemoved field in the second Announce packet by 1, and then sends, to the first translator, the second Announce packet in which the value of the stepsRemoved field increases by 1.

In an embodiment, after receiving the second Announce packet, the second translator encapsulates the second Announce packet, that is, uses the second Announce packet as a payload part, adds a packet header to the payload part, where the packet header includes a MAC header and/or an IP header, and sends an encapsulated second Announce packet to the first translator.

In operation 803, the first translator receives the second Announce packet, and sends a third Announce packet to the first TSN device through a first port, where a source port identity of the third Announce packet is a port identity of the first port, and the first port is a port that is of the first translator and that is connected to the first TSN device.

In an embodiment, the first translator receives the encapsulated second Announce packet, decapsulates the encapsulated second Announce packet to obtain the second Announce packet, and generates the third Announce packet based on the second Announce packet, where the source port identity of the third Announce packet is the port identity of the first port.

In an embodiment, in a case that the second translator does not increase the value of the stepsRemoved field in the second Announce packet by 1, the first translator increases a value of the stepsRemoved field included in the clock parameter in the second Announce packet by 1, to generate the third Announce packet, where a payload part of the third Announce packet carries a clock parameter in which a value of the stepsRemoved increases by 1.

In an embodiment, in a case that the second translator increases the value of the stepsRemoved field in the second Announce packet by 1, the first translator extracts the clock parameter from the second Announce packet, to generate the third Announce packet, where the payload part of the third Announce packet carries the extracted clock parameter.

In an embodiment, the first translator generates the third Announce packet, where the payload part of the third Announce packet carries a target dataset.

A system-level parameter carried in a PTP packet header of the third Announce packet is the system-level parameter carried in the PTP packet header of the second Announce packet, or a system-level parameter carried in a packet header of the third Announce packet is a system-level parameter sent by a configuration device and received by the first translator.

In operation 804, the first TSN device receives the third Announce packet.

In an embodiment of this application, when sending an Announce packet, the first translator writes a port identity of a port for sending the Announce packet into a source port identity field of the to-be-sent Announce packet, so that the first TSN device may learn of the port identity of the Announce packet sent by the first forwarder, facilitating fault locating. In addition, a clock parameter in the Announce packet sent by the first translator may be the clock parameter in the Announce packet sent by the second translator and received by the first translator, or may be a clock parameter in the target dataset delivered by the configuration device. The operation of increasing the value of the stepsRemoved field by 1 may be performed by the second translator, or may be performed by the first translator, to provide solutions satisfying different scenarios.

Figure 9:
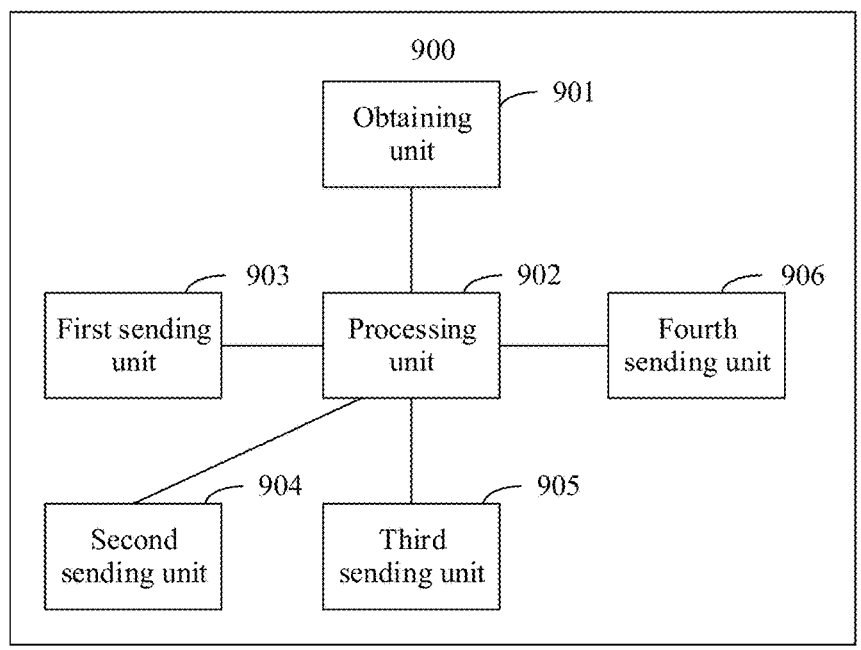
FIG. 9 is a schematic diagram of a structure of a port status configuration apparatus according to an embodiment of this application.

Referring to FIG. 9, an embodiment of this application provides a port status configuration apparatus 900. The apparatus 900 is deployed in the configuration device provided in any one of the foregoing embodiments, for example, deployed in the configuration device provided in the embodiments shown in FIG. 1 to FIG. 8. The apparatus 900 includes:

an obtaining unit 901, configured to obtain port datasets of M ports of N translators, where N is an integer greater than 1, M is an integer greater than 1, the N translators are integrated into at least two independent devices, the M ports are M precision time protocol ports, and the port datasets are precision time protocol port datasets; and a processing unit 902, configured to configure port statuses of the M ports based on the port datasets of the M ports, where the port statuses are precision time protocol port statuses.

In an embodiment, for a detailed implementation process in which the obtaining unit 901 obtains the port datasets of the M ports, refer to related content in operation 504 in the embodiment shown in FIG. 5. Details are not described herein again.

In an embodiment, for a detailed implementation process in which the processing unit 902 configures the port statuses of the M ports, refer to related content in operations 505 and 506 in the embodiment shown in FIG. 5. Details are not described herein again.

In an embodiment, the processing unit 902 is configured to:

configure the port statuses of the M ports based on the port datasets of the M ports and a preset dataset, where the preset dataset is a preset precision time protocol dataset.

In an embodiment, the processing unit 902 is further configured to:

select an optimal dataset from the port datasets of the M ports;

when the optimal dataset is better than the preset dataset, generate a target dataset based on the optimal dataset, where a value of a stepsRemoved field in the target dataset is greater than a value of a stepsRemoved field in the optimal dataset by 1, the preset dataset is a preset precision time protocol dataset, and the target dataset is a precision time protocol dataset; and use the preset dataset as the target dataset when the preset dataset is better than the optimal dataset.

In an embodiment, the apparatus further includes a first sending unit 903.

The processing unit 902 is configured to determine a port status of each of the M ports.

The first sending unit 903 is configured to send the port status of each port to a translator including all of the ports, where the port status is sent via a packet.

In an embodiment, for a detailed implementation process in which the processing unit 902 determines the port statuses of the M ports, refer to optional content in operation 505 in the embodiment shown in FIG. 5. Details are not described herein again.

In an embodiment, the apparatus further includes a second sending unit 904.

The second sending unit 904 is configured to send the target dataset to the N translators, where the target dataset is sent via a packet.

In an embodiment, for a detailed implementation process in which the second sending unit 904 sends the target dataset, refer to related content in operation 506 in the embodiment shown in FIG. 5. Details are not described herein again.

In an embodiment, when both the target dataset and the port status are sent via a packet, the target dataset and the port status are included in a same packet, or included in different packets.

In an embodiment, the preset dataset is a dataset of a virtual device of a communication network, and the communication network is a network including the N translators.

In an embodiment, the obtaining unit obtains the port dataset via a port dataset packet.

In an embodiment, the apparatus further includes a third sending unit 905.

The processing unit 902 is further configured to determine a port identity of each of the M ports.

The third sending unit 905 is further configured to send the port identity of each port to the translator including all of the ports, where the port identity is sent via a packet, and the port identity of each port is a precision time protocol port identity.

In an embodiment, for a detailed implementation process in which the processing unit 902 determines the port identity, refer to related content in operation 501 in the embodiment shown in FIG. 5. Details are not described herein again.

In an embodiment, the processing unit 902 is configured to:
determine the port identity of each port based on a port number of each port and an identity of the virtual device of the communication network, where the communication network is a network including the N translators, and the port number of each port is a precision time protocol port number.

In an embodiment, the apparatus further includes a fourth sending unit 906.

The fourth sending unit 906 is configured to send a system-level parameter of the virtual device of the communication network to the N translators, where the communication network is a network including the N translators, and the system-level parameter is a precision time protocol system-level parameter.

In an embodiment, the translator is a network-side time sensitive network translator NW-TT or a device-side time sensitive network translator DS-TT.

In an embodiment, the NW-TT is an independent device, or the NW-TT is integrated into a user plane function UPF device; and the DS-TT is an independent device, or the DS-TT is integrated into user equipment UE.

In an embodiment, the apparatus is deployed in a communication network for connecting a time sensitive network TSN device.

In an embodiment, the apparatus is an independent device, or is integrated into one of the N translators, or is located in a same device as one or more of the N translators.

In an embodiment, the port status includes a slave state, a master state, or a passive state.

In an embodiment of this application, because the N translators are integrated into at least two independent devices, and the obtaining unit obtains the port datasets of the M ports of the N translators, the processing unit configures the port statuses of the M ports based on the port datasets of the M ports, to implement automatic configuration of the port statuses and improve configuration accuracy. Because the port status can be automatically configured, the port status can be modified in time in the case of changes occurring on the port status of the translator.

Figure 10:
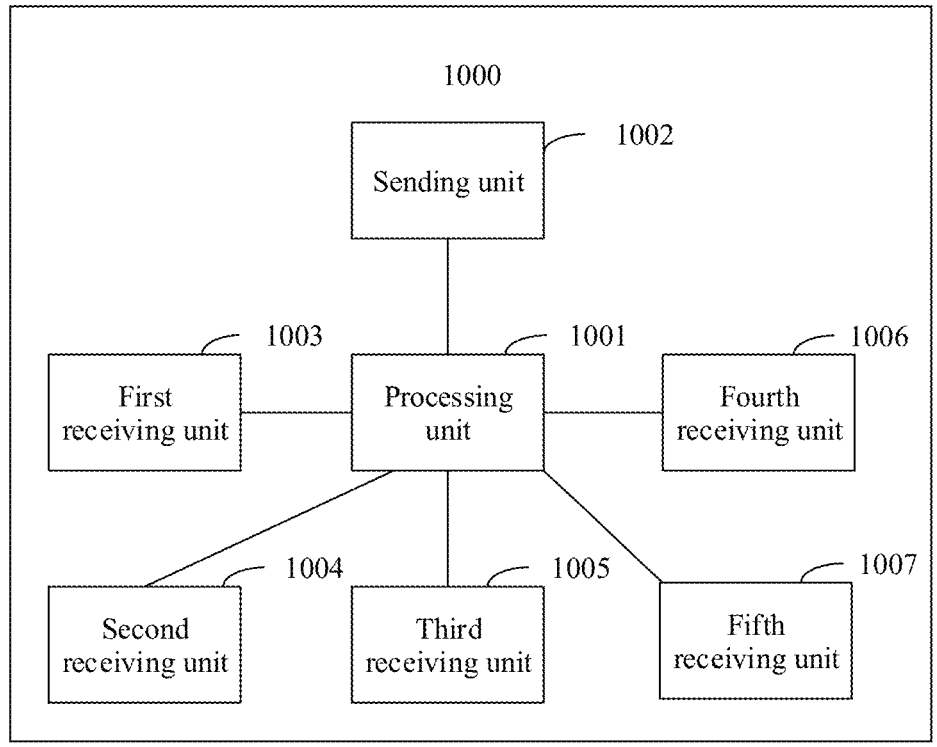
FIG. 10 is a schematic diagram of a structure of another port status configuration apparatus according to an embodiment of this application.

Referring to FIG. 10, an embodiment of this application provides a port status configuration apparatus 1000. The apparatus 1000 is deployed in the first translator provided in any one of the foregoing embodiments, for example, deployed in the first translator provided in the embodiments shown in FIG. 1 to FIG. 8. The apparatus 1000 includes:
a processing unit 1001, configured to obtain port datasets of W ports of the apparatus 1000, where W is an integer greater than or equal to 1, N is an integer greater than 1, the port datasets are precision time protocol port datasets, and the apparatus is one of N translators; and
a sending unit 1002, configured to send the port datasets of the W ports to a configuration device, where the port datasets are used by the configuration device to determine port statuses of the W ports based on the port datasets of the W ports and port datasets of ports of other translators of the N translators, the N translators are integrated in at least two independent devices, and the port statuses of the W ports are precision time protocol port statuses.

In an embodiment, for a detailed implementation process in which the processing unit 1001 obtains the port datasets, refer to related content in operation 502 in the embodiment shown in FIG. 5. Details are not described herein again.

In an embodiment, the W ports include a first port, and a port dataset of the first port includes a port identity of the first port, or the port identity and a clock parameter, where the clock parameter is a precision time protocol clock parameter.

The clock parameter is a clock parameter that is sent by a first device and received by the first port, and the first device is connected to the apparatus.

In an embodiment, the sending unit 1002 sends the port dataset via a packet.

In an embodiment, the apparatus further includes a first receiving unit 1003.

The first receiving unit 1003 is configured to receive the port statuses of the W ports sent by the configuration device, where the port statuses are received via a packet.

The processing unit 1001 is further configured to set the port statuses of the W ports based on the received port statuses of the W ports.

In an embodiment, for a detailed implementation process in which the processing unit 1001 sets the port statuses, refer to related content in operation 507 in the embodiment shown in FIG. 5. Details are not described herein again.

In an embodiment, the apparatus further includes a second receiving unit 1004.

The second receiving unit 1004 is configured to receive a target dataset sent by the configuration device, where the target dataset is a dataset determined by the configuration device based on a port dataset and a preset dataset received by the configuration device, and both the preset dataset and the target dataset are precision time protocol datasets.

The second receiving unit 1004 receives the target dataset via a packet.

In an embodiment, for a detailed implementation process in which the second receiving unit 1004 receives the target dataset, refer to related content in operation 507 in the embodiment shown in FIG. 5. Details are not described herein again.

In an embodiment, the apparatus further includes a third receiving unit 1005.

The third receiving unit 1005 is configured to receive port identities of the W ports sent by a management device of a communication network, where the port identities of the W ports are generated by the management device based on an identity of a virtual device of the communication network and port numbers of the W ports, the communication network is a network including the N translators, and the port numbers of the W ports are precision time protocol port numbers, where the third receiving unit receives the port identities via a packet.

Alternatively, the third receiving unit 1005 is configured to receive a clock identity of the virtual device of the communication network that is sent by the management device, and the processing unit is further configured to separately generate port identities of the W ports based on the clock identity of the virtual device and the port numbers of the W ports, where the clock identity of the virtual device is generated by the management device based on the identity of the virtual device of the communication network.

In an embodiment, the management device of the communication network is the configuration device.

In an embodiment, the apparatus further includes a fourth receiving unit 1006.

The fourth receiving unit 1006 is configured to receive a system-level parameter of the virtual device of the communication network that is sent by the configuration device, where the system-level parameter is a precision time protocol system-level parameter.

The processing unit 1006 is further configured to: when the sending unit 1002 sends a packet, fill the system-level parameter in the packet, where the packet is a precision time protocol packet.

The communication network is a network including the N translators.

In an embodiment, for a detailed implementation process in which the fourth receiving unit 1006 receives the system-level parameter, refer to related content in operation 507 in the embodiment shown in FIG. 5. Details are not described herein again.

In an embodiment, the processing unit 1001 is configured to: when the sending unit 1002 sends a first announce Announce packet through a port in a master state, fill the target dataset in the first Announce packet.

The sending unit 1002 is further configured to send the first Announce packet through the port in the master state.

In an embodiment, for a detailed implementation process in which the processing unit 1001 fills the target dataset, refer to related content in operation 507 in the embodiment shown in FIG. 5, or refer to related content in operation 803 in the embodiment shown in FIG. 8. Details are not described herein again.

In an embodiment, the apparatus further includes a fifth receiving unit 1007.

The fifth receiving unit 1007 is configured to receive a second Announce packet sent by a second translator, where the second Announce packet includes a stepsRemoved field.

The processing unit 1001 is further configured to generate a third Announce packet based on the second Announce packet, where a source port identity in the third Announce packet is a port identity of the third Announce packet sent by the sending unit.

In an embodiment, for a detailed implementation process in which the processing unit 1001 generates the third Announce packet, refer to related content in operation 803 in the embodiment shown in FIG. 8. Details are not described herein again.

In an embodiment, the processing unit 1001 is further configured to increase a value of the stepsRemoved field by 1, and the third Announce packet includes the stepsRemoved field whose value increases by 1.

In an embodiment, the port status includes a slave state, a master state, or a passive state.

In an embodiment of this application, the processing unit obtains the port datasets of the W ports of the first translator, the sending unit sends the port datasets to the configuration device, and other N−1 translators of the N translators also send the port datasets to the configuration device. In this way, the configuration device may obtain the port datasets of the ports of the N translators, and configure the port statuses of the W ports based on the received port datasets, to implement automatic configuration of the port statuses and improve configuration accuracy. Because the port status can be automatically configured, the port status can be modified in time in the case of changes occurring on the port status of the translator.

Figure 11:
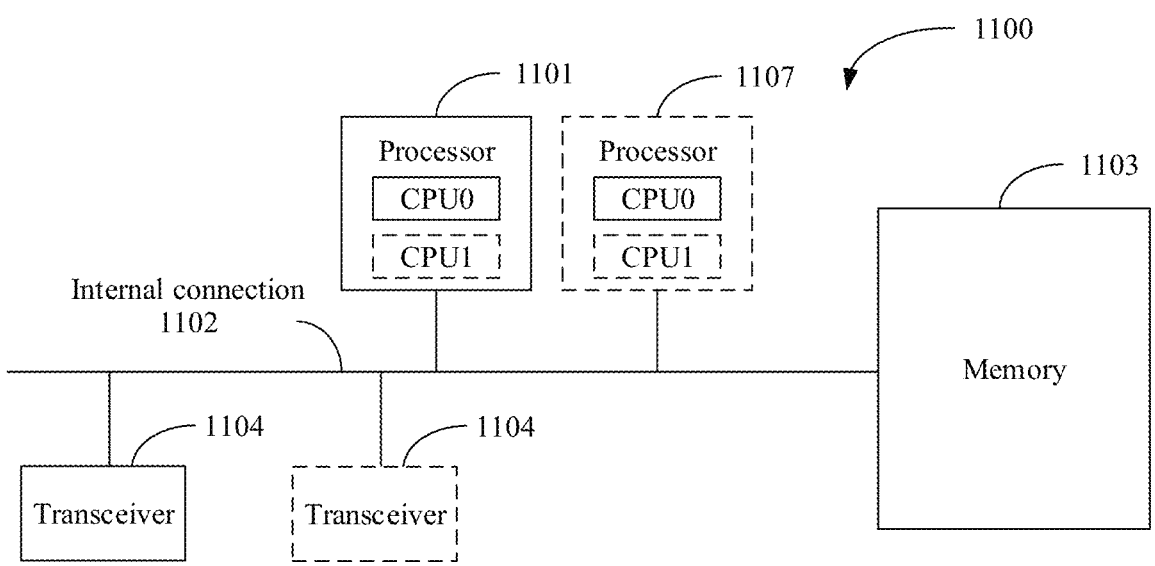
FIG. 11 is a schematic diagram of a structure of another port status configuration apparatus according to an embodiment of this application.

FIG. 11 is a schematic diagram of a port status configuration apparatus 1100 according to an embodiment of this application. The apparatus 1100 may be the configuration device in any one of the foregoing embodiments. The apparatus 1100 includes at least one processor 1101, an internal connection 1102, a memory 1103, and at least one transceiver 1104.

The apparatus 1100 is an apparatus of a hardware structure, and may be configured to implement the functional modules in the apparatus 900 in FIG. 9. For example, a person skilled in the art may figure out that the obtaining unit 901 and the processing unit 902 in the apparatus 900 shown in FIG. 9 may be implemented by using the at least one processor 1101 by invoking code in the memory 1103, and the first sending unit 903, the second sending unit 904, the third sending unit 905, and the fourth sending unit 906 in the apparatus 900 shown in FIG. 9 may be implemented by the transceiver 1104.

The apparatus 1100 may further be configured to implement functions of the configuration device in any one of the foregoing embodiments.

The processor 1101 may be a general-purpose central processing unit (CPU), a network processor (NP), a microprocessor, an application-specific integrated circuit (ASIC), or one or more integrated circuits configured to control program execution of the solutions of this application.

The internal connection 1102 may include a path for transmitting information between the foregoing components. Optionally, the internal connection 1102 is a board, a bus, or the like.

The transceiver 1104 is configured to communicate with another device or a communication network.

The memory 1103 may be a read-only memory (ROM) or another type of static storage device capable of storing static information and instructions, a random access memory (RAM) or another type of dynamic storage device capable of storing information and instructions, an electrically erasable programmable read-only memory (EEPROM), a compact disc read-only memory (CD-ROM) or another compact disc storage, an optical disc storage (including a compressed optical disc, a laser disc, an optical disc, a digital versatile disk, a Blu-ray optical disc, and the like), a magnetic disk storage medium or another magnetic storage device, or any other medium capable of carrying or storing expected program code in a form of an instruction or a data structure and capable of being accessed by a computer, but the memory 1103 is not limited thereto. The memory may exist independently, and is connected to the processor through the bus. The memory may alternatively be integrated with the processor.

The memory 1103 is configured to store application program code used for executing the solutions of this application, and the processor 1101 controls the execution. The processor 1101 is configured to execute the application program code stored in the memory 1103, and cooperate with the at least one transceiver 1104, so that the apparatus 1100 implements functions in the method in this patent.

In an embodiment, the processor 1101 may include one or more CPUs such as a CPU0 and a CPU1 in FIG. 11.

In an embodiment, the apparatus 1100 may include a plurality of processors, for example, the processor 1101 and a processor 1107 in FIG. 11. Each of the processors may be a single-core (single-CPU) processor, or may be a multi-core (multi-CPU) processor. The processor herein may be one or more devices, circuits, and/or processing cores configured to process data (for example, computer program instructions).

Figure 12:
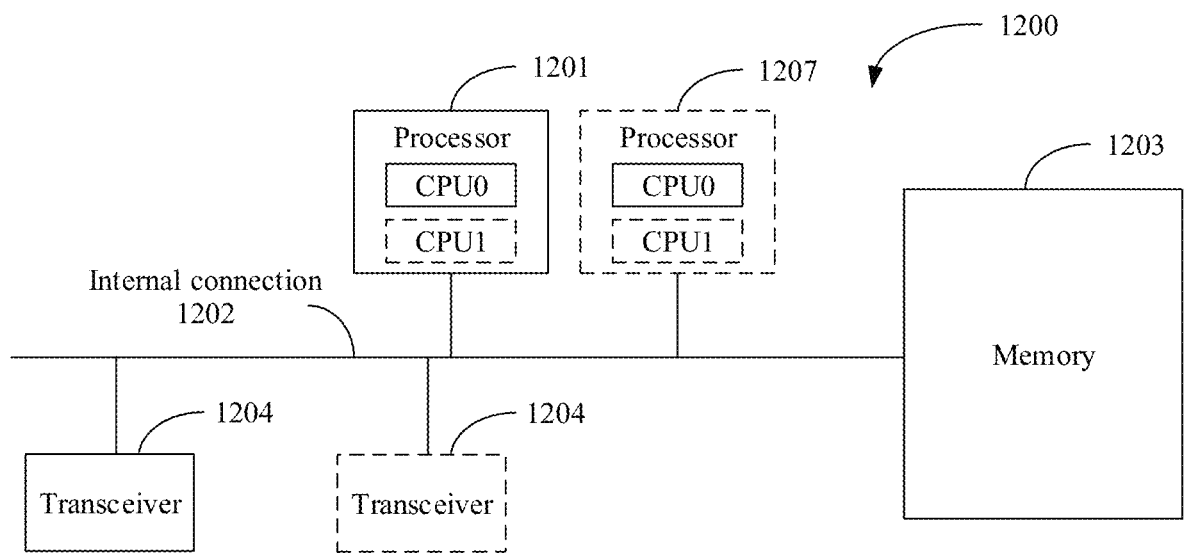
FIG. 12 is a schematic diagram of a structure of another port status configuration apparatus according to an embodiment of this application.

FIG. 12 is a schematic diagram of a port status configuration apparatus 1200 according to an embodiment of this application. The apparatus 1200 may be the first translator in any one of the foregoing embodiments. The apparatus 1200 includes at least one processor 1201, an internal connection 1202, a memory 1203, and at least one transceiver 1204.

The apparatus 1200 is an apparatus of a hardware structure, and may be configured to implement the functional modules in the apparatus 1000 in FIG. 10. For example, a person skilled in the art may figure out that the processing unit 1001 in the apparatus 1000 shown in FIG. 10 may be implemented by using the at least one processor 1201 by invoking code in the memory 1203, and the sending unit 1002, the first receiving unit 1003, the second receiving unit 1004, the third receiving unit 1005, the fourth receiving unit 1006, and the fifth receiving unit 1007 in the apparatus 1000 shown in FIG. 10 may be implemented by the transceiver 1204.

The apparatus 1200 may further be configured to implement functions of the first translator in any one of the foregoing embodiments.

The processor 1201 may be a CPU, a network processor (NP), a microprocessor, an application-specific integrated circuit (ASIC), or one or more integrated circuits configured to control program execution of the solutions of this application.

The internal connection 1202 may include a path for transmitting information between the foregoing components. Optionally, the internal connection 1202 is a board, a bus, or the like.

The transceiver 1204 is configured to communicate with another device or a communications network.

The memory 1203 may be a read-only memory (ROM) or another type of static storage device capable of storing static information and instructions, a random access memory (RAM) or another type of dynamic storage device capable of storing information and instructions, an electrically erasable programmable read-only memory (EEPROM), a compact disc read-only memory (CD-ROM) or another compact disc storage, an optical disc storage (including a compressed optical disc, a laser disc, an optical disc, a digital versatile disk, a Blu-ray optical disc, and the like), a magnetic disk storage medium or another magnetic storage device, or any other medium capable of carrying or storing expected program code in a form of an instruction or a data structure and capable of being accessed by a computer, but the memory 1203 is not limited thereto. The memory may exist independently, and is connected to the processor through the bus. The memory may alternatively be integrated with the processor.

The memory 1203 is configured to store application program code for executing the solutions of this application, and the processor 1201 controls the execution. The processor 1201 is configured to execute the application program code stored in the memory 1203, and cooperate with the at least one transceiver 1204, so that the apparatus 1200 implements functions in the method in this patent.

In specific implementation, in an embodiment, the processor 1201 may include one or more CPUs such as a CPU0 and a CPU1 in FIG. 12.

In an embodiment, the apparatus 1200 may include a plurality of processors, for example, the processor 1201 and a processor 1207 in FIG. 12. Each of the processors may be a single-core (single-CPU) processor, or may be a multi-core (multi-CPU) processor. The processor herein may be one or more devices, circuits, and/or processing cores configured to process data (for example, computer program instructions).

Figure 13:
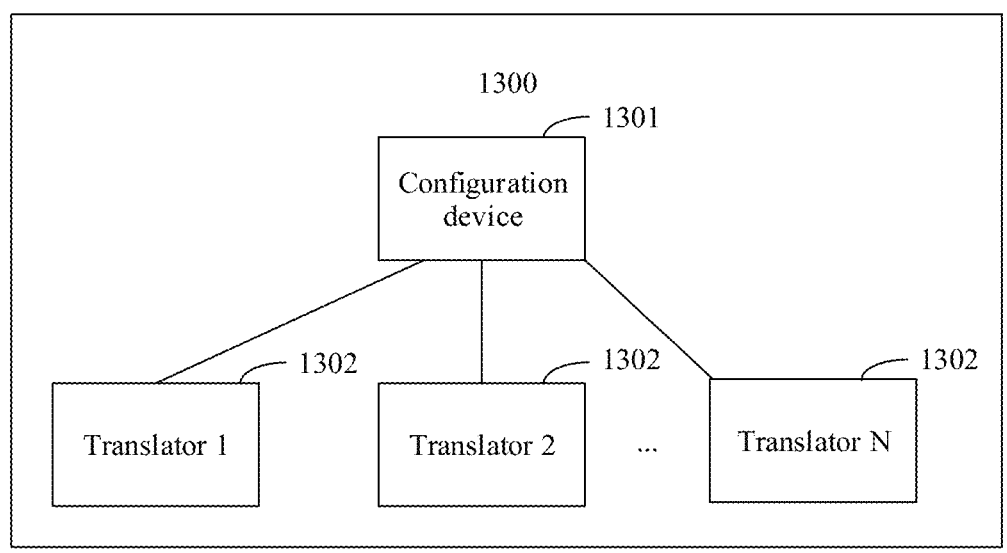
FIG. 13 is a schematic diagram of a structure of a port status configuration system according to an embodiment of this application.

Referring to FIG. 13, an embodiment of this application provides a port status configuration system 1300. The system 1300 includes the apparatus 900 shown in FIG. 9 and N apparatuses 1000 shown in FIG. 10, or the system 1300 includes the apparatus 1100 shown in FIG. 11 and N apparatuses 1200 shown in FIG. 12.

The apparatus 900 shown in FIG. 9 and the apparatus 1100 shown in FIG. 11 may be a configuration device 1301. The apparatus 1000 shown in FIG. 10 and the apparatus 1200 shown in FIG. 12 may be translators 1302, that is, include N translators 1302, where the N translators 1302 are integrated into at least two independent devices.

A person of ordinary skill in the art may understand that all or some of the operations of the embodiments may be implemented by hardware or a program instructing related hardware. The program may be stored in a computer-readable storage medium. The storage medium may be a read-only memory, a magnetic disk, an optical disc, or the like.

The foregoing descriptions are merely optional embodiments of this application, but are not intended to limit this application. Any modification, equivalent replacement, or improvement made without departing from the principle of this application should fall within the protection scope of this application.

What is claimed is:

1. A method for maintaining port statuses, comprising:
obtaining, by a first translator of a plurality of translators, port datasets of a plurality of ports of the first translator, wherein the port datasets comprise precision time protocol port datasets; and
sending, by the first translator, the port datasets of the ports to a configuration device, wherein the port datasets are used by the configuration device to determine port statuses of the ports based on the port datasets of the ports and port datasets of ports of other translators of the translators, the translators are integrated in at least two independent devices, and the port statuses of the ports comprise precision time protocol port statuses.

2. The method according to claim 1, wherein the ports comprise a first port, and a port dataset of the first port comprises a port identity of the first port, or the port identity and a clock parameter, wherein the clock parameter comprises a precision time protocol clock parameter; and the clock parameter comprises a clock parameter that is sent by a first device connected to the first translator and received by the first port.

3. The method according to claim 1, wherein the port datasets are sent via a packet.

4. The method according to claim 1, further comprising:
filling, by the first translator when sending a first announce (Announce) packet through a port in a master state, a target dataset in the first Announce packet; and
sending, by the first translator, the first Announce packet through the port in the master state.

5. The method according to claim 1, wherein the method further comprises:
by the first translator, a second Announce packet sent by a second translator, wherein the second Announce packet comprises a stepsRemoved field; and
generating, by the first translator, a third Announce packet based on the second Announce packet, wherein a source port identity in the third Announce packet is a port identity of the third Announce packet sent by the first translator.

6. The method according to claim 5, wherein generating the third Announce packet based on the second Announce packet comprises:
increasing, by the first translator, a value of the stepsRemoved field by 1, wherein the third Announce packet comprises the stepsRemoved field whose value increases by 1.

7. The method according to claim 1, wherein a port status comprises a slave state, a master state, or a passive state.

8. An apparatus for maintaining port statuses, comprising:
a memory comprising instructions;
a processor coupled to the memory, wherein when the instructions are executed by the processor, cause the apparatus to:
obtain port datasets of a plurality of ports of the apparatus, wherein the port datasets are precision time protocol port datasets, and the apparatus is one of a plurality of translators; and
send the port datasets of the ports to a configuration device, wherein the port datasets are used by a processor of the configuration device to determine port statuses of the ports based on the port datasets of the ports and port datasets of ports of other translators of the translators, the translators are integrated in at least two independent devices, and the port statuses of the ports comprise precision time protocol port statuses.

9. The apparatus according to claim 8, wherein the ports comprise a first port, and a port dataset of the first port comprises a port identity of the first port, or the port identity and a clock parameter, wherein the clock parameter comprises a precision time protocol clock parameter; and
the clock parameter is sent by a first device connected to the apparatus and received by the first port.

10. The apparatus according to claim 8, wherein the port datasets are sent via a packet.

11. The apparatus according to claim 8, wherein the instructions further cause the apparatus to:
send a first announce (Announce) packet through a port in a master state;
fill a target dataset in the first Announce packet; and
send the first Announce packet through the port in the master state.

12. The apparatus according to claim 8, wherein the instructions further cause the apparatus to:
receive a second Announce packet sent by a second translator, wherein the second Announce packet comprises a stepsRemoved field; and
generate a third Announce packet based on the second Announce packet, wherein a source port identity in the third Announce packet comprises a port identity of the third Announce packet.

13. The apparatus according to claim 8, wherein the instructions further cause the apparatus to:
increase a value of a stepsRemoved field by 1, and the third Announce packet comprises the stepsRemoved field whose value increases by 1.

14. The apparatus according to claim 8, wherein a port status comprises a slave state, a master state, or a passive state.

15. A non-transitory computer-readable medium comprising instructions, which when executed by one or more processors, cause an apparatus to:
obtain port datasets of a plurality of ports of the apparatus, wherein the port datasets are precision time protocol port datasets, and the apparatus is one of a plurality of translators; and
send the port datasets of the ports to a configuration device, wherein the port datasets are used by a processor of the configuration device to determine port statuses of the ports based on the port datasets of the ports and port datasets of ports of other translators of the translators, the translators are integrated in at least two independent devices, and the port statuses of the ports comprise precision time protocol port statuses.

16. The computer-readable medium according to claim 15, wherein the ports comprise a first port, and a port dataset of the first port comprises a port identity of the first port, or the port identity and a clock parameter, wherein the clock parameter comprises a precision time protocol clock parameter; and
the clock parameter is sent by a first device connected to the apparatus and received by the first port.

17. The computer-readable medium according to claim 15, wherein the port datasets are sent via a packet.

18. The computer-readable medium according to claim 15, wherein the instructions further cause the apparatus to:
send a first announce (Announce) packet through a port in a master state;
fill a target dataset in the first Announce packet; and
send the first Announce packet through the port in the master state.

19. The computer-readable medium according to claim 15, wherein the instructions further cause the apparatus to:
receive a second Announce packet sent by a second translator, wherein the second Announce packet comprises a stepsRemoved field; and
generate a third Announce packet based on the second Announce packet, wherein a source port identity in the third Announce packet comprises a port identity of the third Announce packet.

20. The computer-readable medium according to claim 15, wherein the instructions further cause the apparatus to:
increase a value of a stepsRemoved field by 1, and the third Announce packet comprises the stepsRemoved field whose value increases by 1.

* * * * *